US005787387A

United States Patent [19]

Aguilar

[11] Patent Number: 5,787,387

[45] Date of Patent: Jul. 28, 1998

[54] HARMONIC ADAPTIVE SPEECH CODING METHOD AND SYSTEM

[75] Inventor: Joseph Gerard Aguilar, Oak Lawn, Ill.

[73] Assignee: Voxware, Inc., Princeton, N.J.

[21] Appl. No.: 273,069

[22] Filed: Jul. 11, 1994

[51] Int. Cl.[6] .......... G01L 3/02

[52] U.S. Cl. .......... 704/208; 704/207; 704/268

[58] Field of Search .......... 395/2.17, 2.28, 395/2.29, 2.67, 2.77, 2.71; 704/208, 219, 220, 258, 262, 268, 214, 207, 205, 206

[56] References Cited

U.S. PATENT DOCUMENTS

| | | | |
|---|---|---|---|
| 3,976,842 | 8/1976 | Hoyt | 179/15.55 T |
| 4,015,088 | 3/1977 | Dubnowski et al. | 704/207 |
| 4,020,291 | 4/1977 | Kitamura et al. | 179/15.55 T |
| 4,076,958 | 2/1978 | Fulghum | 704/258 |
| 4,406,001 | 9/1983 | Klasco et al. | 369/88 |
| 4,433,434 | 2/1984 | Mozer | 381/30 |
| 4,435,831 | 3/1984 | Mozer | 381/30 |
| 4,435,832 | 3/1984 | Asada et al. | 381/34 |
| 4,464,784 | 8/1984 | Agnello | 381/61 |
| 4,700,391 | 10/1987 | Leslie, Jr. et al. | 381/35 |
| 4,771,465 | 9/1988 | Bronson et al. | 381/36 |
| 4,792,975 | 12/1988 | MacKay | 381/34 |
| 4,797,925 | 1/1989 | Lin | 381/36 |
| 4,797,926 | 1/1989 | Bronson et al. | 381/36 |
| 4,802,221 | 1/1989 | Jibbe | 381/34 |
| 4,821,324 | 4/1989 | Ozawa et al. | 381/31 |
| 4,839,923 | 6/1989 | Kotzin | 381/31 |
| 4,852,168 | 7/1989 | Sprague | 381/35 |
| 4,856,068 | 8/1989 | Quatieri, Jr. et al. | 381/47 |
| 4,864,620 | 9/1989 | Bialick | 381/34 |
| 4,885,790 | 12/1989 | McAulay et al. | 381/36 |
| 4,922,537 | 5/1990 | Frederiksen | 381/31 |
| 4,937,873 | 6/1990 | McAulay et al. | 381/51 |
| 4,945,565 | 7/1990 | Ozawa et al. | 381/383 |
| 4,964,166 | 10/1990 | Wilson | 381/34 |
| 4,991,213 | 2/1991 | Wilson | 381/34 |
| 5,001,758 | 3/1991 | Galand et al. | 704/249 |
| 5,023,910 | 6/1991 | Thompson | 381/37 |
| 5,054,072 | 10/1991 | McAulay et al. | 381/31 |
| 5,056,143 | 10/1991 | Taguchi | 381/35 |
| 5,073,938 | 12/1991 | Galand | 381/34 |
| 5,081,681 | 1/1992 | Hardwick et al. | 381/51 |
| 5,101,433 | 3/1992 | King | 381/35 |

(List continued on next page.)

OTHER PUBLICATIONS

Trancoso et al., "A Study on the Relationships Between Stochastic and Harmonic Coding", Proceedings of ICASSP 86, Tokyo, pp. 1709–1712, Apr. 1986.

Marques et al., "A Background for Sinusoid Based Representation of Voiced Speech", Proceedings of ICASSP 86, Tookyo, pp. 1233–1236, Apr. 1986.

McAulay et al., "Mid–Rate Coding Based on a Sinusoidal Representation of Speech", Proceedings of ICASSP 85, pp. 945–948, Mar. 1985.

(List continued on next page.)

*Primary Examiner*—Richemond Dorvil
*Attorney, Agent, or Firm*—Pennie & Edmonds LLP

[57] ABSTRACT

A method and system is provided for encoding and decoding of speech signals at a low bit rate. The continuous input speech is divided into voiced and unvoiced time segments of a predetermined length. The encoder of the system uses a linear predictive coding model for the unvoiced speech segments and harmonic frequencies decomposition for the voiced speech segments. Only the magnitudes of the harmonic frequencies are determined using the discrete Fourier transform of the voiced speech segments. The decoder synthesizes voiced speech segments using the magnitudes of the transmitted harmonics and estimates the phase of each harmonic from the signal in the preceding speech segments. Unvoiced speech segments are synthesized using linear prediction coding (LPC) coefficients obtained from codebook entries for the poles of the LPC coefficient polynomial. Boundary conditions between voiced and unvoiced segments are established to insure amplitude and phase continuity for improved output speech quality.

52 Claims, 16 Drawing Sheets

U.S. PATENT DOCUMENTS

| | | | |
|---|---|---|---|
| 5,109,417 | 4/1992 | Fielder et al. | 381/36 |
| 5,142,656 | 8/1992 | Fielder et al. | 381/37 |
| 5,155,772 | 10/1992 | Brandman et al. | 381/32 |
| 5,175,769 | 12/1992 | Hajna, Jr. et al. | 381/34 |
| 5,177,799 | 1/1993 | Naitoh | 381/34 |
| 5,189,701 | 2/1993 | Jain | 381/41 |
| 5,195,166 | 3/1993 | Hardwick et al. | 395/2 |
| 5,216,747 | 6/1993 | Hardwick et al. | 395/2 |
| 5,226,084 | 7/1993 | Hardwick et al. | 381/41 |
| 5,226,108 | 7/1993 | Hardwick et al. | 395/2 |
| 5,247,579 | 9/1993 | Hardwick et al. | 381/40 |
| 5,303,346 | 4/1994 | Fesseler et al. | 395/2.39 |
| 5,311,561 | 5/1994 | Akagiri | 375/122 |
| 5,327,521 | 7/1994 | Savic et al. | 395/2.81 |
| 5,339,164 | 8/1994 | Lim | 358/261.1 |
| 5,369,724 | 11/1994 | Lim | 395/2.15 |
| 5,448,679 | 9/1995 | McKiel, Jr. | 704/208 |
| 5,517,595 | 5/1996 | Kleijn | 704/205 |

OTHER PUBLICATIONS

Almeida et al., "Variable–Frequency Synthesis: An Improved Harmonic Coding Scheme", Proceedings of ICASSP 84, pp. 27.5.1–27.5.4, Mar. 1984.

McAulay et al., "Magnitude–Only Reconstruction Using A Sinusoidal Speech Model", Proceedings of ICASSP 84, pp. 27.6.1–27.6.4, Mar. 1984.

Medan et al., "Super Resolution Pitch Determination of Speech Signals", IEEE Trans. On Signal Processing vol. 39, 1991, pp. 40–48., Jan. 1991.

S.J. Orphanidis, "Optimum Signal Processing", McGraw–Hill, New York, 1988, pp. 202–207.

Griffin et al., "Speech Synthesis from Short–Time Fourier Transform Magnitude and Its Application to Speech Processing", Proceedings of ICASSP 84, pp. 2.4.1–2.4.4, Mar. 1984.

Thompson, David L., "Parametric Models of the Magnitude/Phase Spectrum for Harmonic Speech Coding", Proceedings of ICASSP 88, New York, pp. 378–381, Apr. 1988.

McAulay et al., "Phase Modelling and its Application Sinusoidal Transform Coding", Proceedings of ICASSP 86, pp. 1713–1715., Apr. 1986.

McAulay et al., "Computationally Efficient Sine–wave Synthesis and its Application to Sinusoidal Transform Coding", Proceedings of ICASSP 88, pp. 370–373, Apr. 1988.

Hardwick et al., "A 4.8 KBPS Multi–Band Excitation Speech Coder", Proceedings of ICASSP 88, pp. 374–377, Apr. 1988.

Conference record of the twenty–sixth Asilomar Conference on signals, systems and computers, Kumaresan et al, On accurately tracking the harmonics components' parameters in voiced–speech segments and subsequent modeling by a transfer function, pp. 472–476, Oct. 1992.

Procedings of 1994 IEEE Region 10's Ninth Annual International COnference; Qiu et al, "A fundamental frequency detector of speech signals based on short time Fourier transform", pp. 526–530 vol. 1, Aug. 1994.

Unvoiced Data Packet

Voiced Data Packet

HARMONIC ADAPTIVE SPEECH CODING METHOD AND SYSTEM

BACKGROUND OF THE INVENTION

The present invention relates to speech processing and more specifically to a method and system for low bit rate digital encoding and decoding of speech using harmonic analysis and synthesis of the voiced portions and predictive coding of the unvoiced portions of the speech.

Reducing the bit rate needed for storage and transmission of a speech signal while preserving its perceptual quality is among the primary objectives of modern digital speech processing systems. In order to meet these contradicting requirements various models of the speech formation process have been proposed in the past. Most frequently, speech is modeled on a short-time basis as the response of a linear system excited by a periodic impulse train for voiced sounds or random noise for the unvoiced sounds. For mathematical convenience, it is assumed that the speech signal is stationary within a given short time segment, so that the continuous speech is represented as an ordered set of distinct voiced and unvoiced speech segments.

Voiced speech segments, which correspond to vowels in a speech signal, typically contribute most to the intelligibility of the speech which is why it is important to accurately represent these segments. However, for a low-pitched voice, a set of more than 80 harmonic frequencies ("harmonics") may be measured within a voiced speech segment within a 4 kHz bandwidth. Clearly, encoding information about all harmonics of such segment is only possible if a large number of bits is used. Therefore, in applications where it is important to keep the bit rate low, simplified speech models need to be employed.

One conventional solution for encoding speech at low bit rates is based on a sinusoidal speech representation model. U.S. Pat. No. 5,054,072 to McAuley for example describes a method for speech coding which uses a pitch extraction algorithm to model the speech signal by means of a harmonic set of sinusoids that serve as a "perceptual" best fit to the measured sinusoids in a speech segment. The system generally attempts to encode the amplitude envelope of the speech signal by interpolating this envelope with a reduced set of harmonics. In a particular embodiment, one set of frequencies linearly spaced in the baseband (the low frequency band) and a second set of frequencies logarithmically spaced in the high frequency band are used to represent the actual speech signal by exploiting the correlation between adjacent sinusoids. A pitch adaptive amplitude coder is then used to encode the amplitudes of the estimated harmonics. The proposed method, however, does not provide accurate estimates, which results in distortions of the synthesized speech.

The McAuley patent also provides a model for predicting the phases of the high frequency harmonics from the set of coded phases of the baseband harmonics. The proposed phase model, however, requires a considerable computational effort and furthermore requires the transmission of additional bits to encode the baseband harmonics phases so that very low bit rates may not be achieved using the system.

U.S. Pat. No. 4,771,465 describes a speech analyzer and synthesizer system using a sinusoidal encoding and decoding technique for voiced speech segments and noise excitation or multipulse excitation for unvoiced speech segments. In the process of encoding the voiced segments a fundamental subset of harmonic frequencies is determined by a speech analyzer and is used to derive the parameters of the remaining harmonic frequencies. The harmonic amplitudes are determined from linear predictive coding (LPC) coefficients. The method of synthesizing the harmonic spectral amplitudes from a set of LPC coefficients, however, requires extensive computations using high precision floating point arithmetic and yields relatively poor quality speech.

U.S. Pat. Nos. 5,226,108 and 5,216,747 to Hardwick et al. describe an improved pitch estimation method providing sub-integer resolution. The quality of the output speech according to the proposed method is improved by increasing the accuracy of the decision as to whether given speech segment is voiced or unvoiced. This decision is made by comparing the energy of the current speech segment to the energy of the preceding segments. Furthermore, harmonic frequencies in voiced speech segments are generated using a hybrid approach in which some harmonics are generated in the time domain while the remaining harmonics are generated in the frequency domain. According to the proposed method, a relatively small number of low-frequency harmonics are generated in the time domain and the remaining harmonics are generated in the frequency domain. Voiced harmonics generated in the frequency domain are then frequency scaled, transformed into the time domain using a discrete Fourier transform (DFT), linearly interpolated and finally time scaled. The proposed method generally does not allow accurate estimation of the amplitude and phase information for all harmonics and is computationally expensive.

U.S. Pat. No. 5,226,084 also to Hardwick et al. describes methods for quantizing speech while preserving its perceptual quality. To this end, harmonic spectral amplitudes in adjacent speech segments are compared and only the amplitude changes are transmitted to encode the current frame. A segment of the speech signal is transformed to the frequency domain to generate a set of spectral amplitudes. Prediction spectral amplitudes are then computed using interpolation based on the actual spectral amplitudes of at least one previous speech segment. The differences between the actual spectral amplitudes for the current segment and the prediction spectral amplitudes derived from the previous speech segments define prediction residuals which are encoded. The method reduces the required bit rate by exploiting the amplitude correlation between the harmonic amplitudes in adjacent speech segments, but is computationally expensive.

While the prior art discloses some advances toward achieving a good quality speech at a low bit rate, it is perceived that there exists a need for improved methods for encoding and decoding of speech at such low bit rates. More specifically, there is a need to obtain accurate estimates of the amplitudes of the spectral harmonics in voiced speech segments in a computationally efficient way and to develop a method and system to synthesize such voiced speech segments without the requirement to store or transmit separate phase information.

SUMMARY OF THE INVENTION

Accordingly, it is an object of the present invention to provide a low bit-rate method and system for encoding and decoding of speech signals using adaptive harmonic analysis and synthesis of the voiced portions and predictive coding of the unvoiced portions of the speech signal.

It is another object of the present invention to provide a super resolution harmonic amplitude estimator for approximating the speech signal in a voiced time segment as a set of harmonic frequencies.

It is another object of the present invention to provide a novel phase compensated harmonic synthesizer to synthesize speech in voiced segments from a set of harmonic amplitudes and combine the generated speech segment with adjacent voiced or unvoiced speech segments with minimized amplitude and phase distortions to obtain good quality speech at a low bit rate.

These and other objectives are achieved in accordance with the present invention by means of a novel encoder/decoder speech processing system in which the input speech signal is represented as a sequence of time segments (also referred to as frames), where the length of the time segments is selected so that the speech signal within each segment is relatively stationary. Thus, dependent on whether the signal in a time segment represents voiced (vowels) or unvoiced (consonants) portions of the speech, each segment can be classified as either being voiced or unvoiced.

In the system of the present invention the continuous input speech signal is digitized and then divided into segments of predetermined length. For each input segment a determination is next made as to whether it is voiced or unvoiced. Dependent on this determination, each time segment is represented in the encoder by a signal vector which contains different information. If the input segment is determined to be unvoiced, the actual speech signal is represented by the elements of a linear predictive coding vector. If the input segment is voiced, the signal is represented by the elements of a harmonic amplitudes vector. Additional control information including the energy of the segment and the fundamental frequency in voiced segments is attached to each predictive coding and harmonic amplitudes vector to form data packets. The ordered sequence of data packets completely represents the input speech signal. Thus, the encoder of the present invention outputs a sequence of data packets which is a low bit-rate digital representation of the input speech.

More specifically, after the analog input speech signal is digitized and divided into time segments, the system of the present invention determines whether the segment is voiced or unvoiced using a pitch detector to this end. This determination is made on the basis of the presence of a fundamental frequency in the speech segment which is detected by the pitch detector. If such fundamental frequency is detected, the pitch detector estimates its frequency and outputs a flag indicating that the speech segment is voiced.

If the segment is determined to be unvoiced, the system of the present invention computes the roots of a characteristic polynomial with coefficients which are the LPC coefficients for the speech segment. The computed roots are then quantized and replaced by a quantized vector codebook entry which is representative of the unvoiced time segment. In a specific embodiment of the present invention the roots of the characteristic polynomial may be quantized using a neural network linear vector quantizer (LVQ1).

If the speech segment is determined to be voiced, it is passed to a novel super resolution harmonic amplitude estimator which estimates the amplitudes of the harmonic frequencies of the speech segment and outputs a vector of normalized harmonic amplitudes representative of the speech segment.

A parameter encoder next generates for each time segment of the speech signal a data packet, the elements of which contain information necessary to restore the original signal segment. For example, a data packet for an unvoiced speech segment comprises control information, a flag indicating that the segment is unvoiced, the total energy of the segment or the prediction error power, and the elements of the codebook entry defining the roots of the LPC coefficient polynomial. On the other hand, a data packet for a voiced speech segment comprises control information, a flag indicating that the segment is voiced, the sum total of the harmonic amplitudes of the segment, the fundamental frequency and a set of estimated normalized harmonic amplitudes. The ordered sequence of data packets at the output of the parameter encoder is ready for storage or transmission of the original speech signal.

At the synthesis side, a decoder receives the ordered sequence of data packets representing unvoiced and voiced speech signal segments. If the voiced/unvoiced flag indicates that a data packet represents an unvoiced time segment, the transmitted quantized pole vector is used as an index into a pole codebook to determine the LPC coefficients of the unvoiced synthesis (prediction) filter. A gain adjusted white noise generator is then used as the input of the synthesis filter to reconstruct the unvoiced speech segment.

If the data packet flag indicates that a segment is voiced, a novel phase compensated harmonic synthesizer is used to synthesize the voiced speech segment and provide amplitude and phase continuity to the signal of the preceding speech segment. Specifically, using the harmonic amplitudes vector of the voiced data packet, the phase compensated harmonic synthesizer computes the conditions required to insure amplitude and phase continuity between adjacent voiced segments and computes the parameters of the voiced to unvoiced or unvoiced to voiced speech segment transitions. The phases of the harmonic frequencies in a voiced segment are computed from a set of equations defining the phases of the harmonic frequencies in the previous segment. The amplitudes of the harmonic frequencies in a voiced segment are determined from a linear interpolation of the received amplitudes of the current and the previous time segments. Continuous boundary conditions between signal transitions at the ends of the segment are finally established before the synthesized signal is passed to a digital-to-analog converter to reproduce the original speech.

BRIEF DESCRIPTION OF THE DRAWINGS

The invention will be next be described in detail by reference to the following drawings in which.

DETAILED DESCRIPTION OF THE INVENTION

During the course of the description like numbers will be used to identify like elements shown in the figures. Bold face letters represent vectors, while vector elements and scalar coefficients are shown in standard print.

Figure 1:
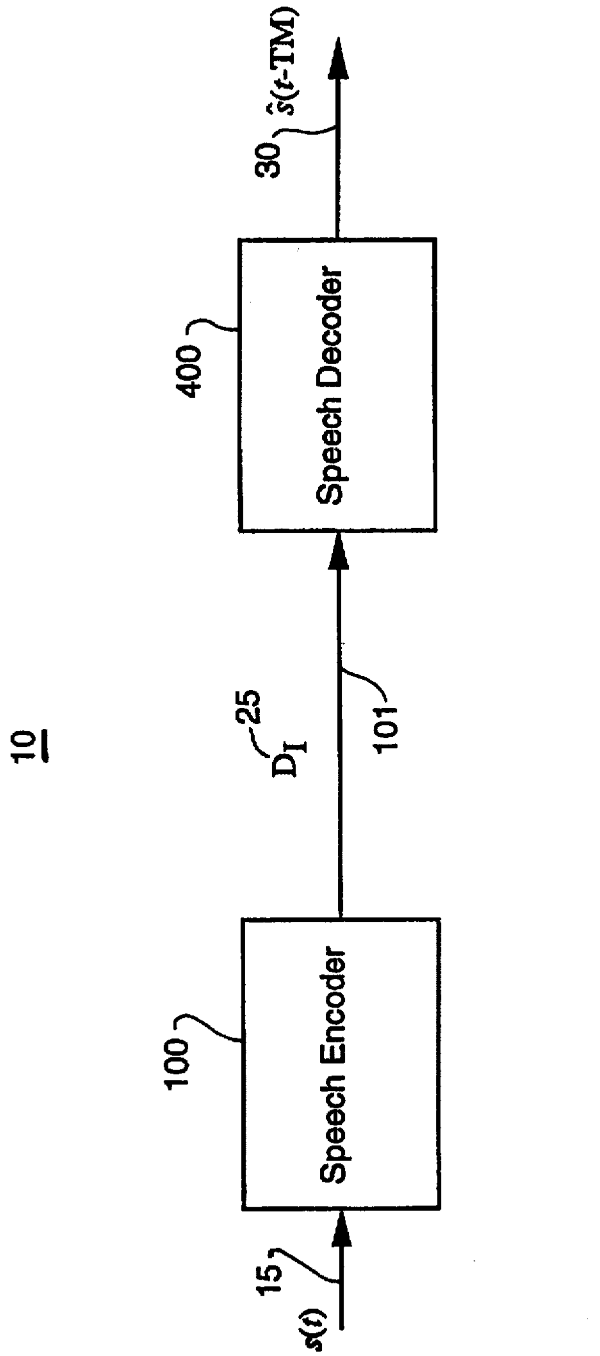
FIG. 1 is a block diagram of the speech processing system of the present invention.

FIG. 1 is a block diagram of the speech processing system 10 for encoding and decoding speech in accordance with the present invention. Analog input speech signal s(t), 15 from an arbitrary voice source is received at encoder 100 for subsequent storage or transmission over a communications channel. Encoder 100 digitizes the analog input speech signal 15, divides the digitized speech sequence into speech segments and encodes each segment into a data packet 25 of length I information bits. The encoded speech data packets 25 are transmitted over communications channel 101 to decoder 400. Decoder 400 receives data packets 25 in their original order to synthesize a digital speech signal which is then passed to a digital-to-analog converter to produce a time delayed analog speech signal 30, denoted s(t-Tm), as explained in detail next.

A. The Encoder Block

Figure 2:
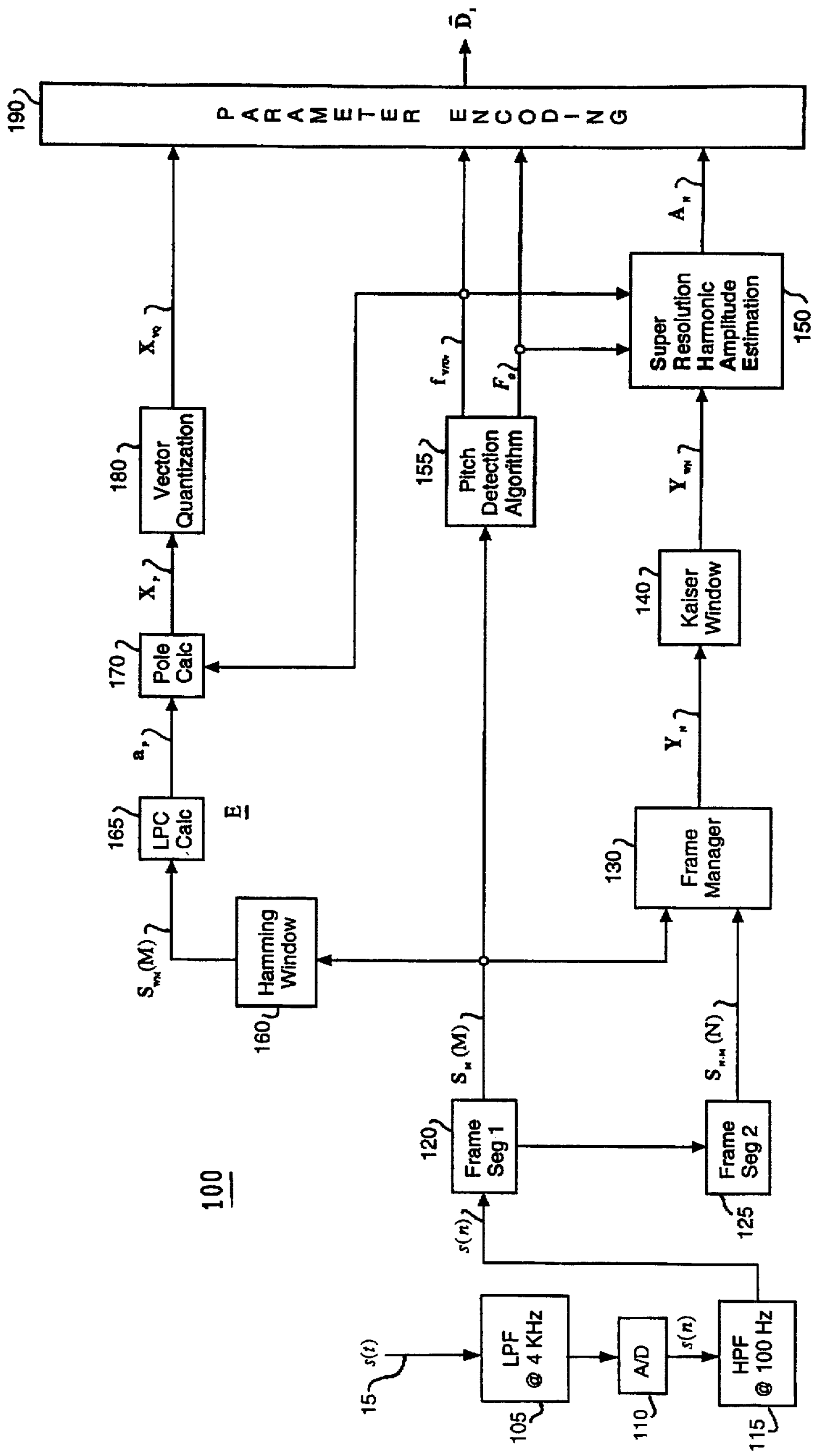
FIG. 2 is a schematic block diagram of the encoder used in the system of FIG. 1.

FIG. 2 illustrates the main elements of encoder 100 and their interconnections in greater detail. Blocks 105, 110 and 115 perform signal pre-processing to facilitate encoding of the input speech. In particular, analog input speech signal 15 is low pass filtered in block 105 to eliminate frequencies outside the human voice range. Low pass filter (LPF) 105 has a cutoff frequency of about 4 KHz which is adequate for the purpose. The low pass filtered analog signal is then passed to analog-to-digital converter 110 where it is sampled and quantized to generate a digital signal s(n) suitable for subsequent processing. Analog-to-digital converter 110 preferably operates at a sampling frequency $f_s$=8 KHz which, in accordance with the Nyquist criterion, corresponds to twice the highest frequency in the low pass filtered analog signal s(t). It will be appreciated that other sampling frequencies may be used as long as they satisfy the Nyquist criterion. Finally, digital input speech signal s(n) is passed through a high pass filter (HPF) 115 which has a cutoff frequency of about 100 Hz in order to eliminate any low frequency noise, such as 60 Hz AC voltage interference.

The filtered digital speech signal s(n) is next divided into time segments of a predetermined length in frame segmenters 120 and 125. Digital speech signal s(n) is first buffered in frame segmenter 120 which outputs a delayed speech vector $S_M(M)$ of length M samples. Frame segmenter 120 introduces a time delay of M samples between the current sample of speech signal s(n) and the output speech vector $S_M(M)$. In a specific embodiment of the present invention, the length M is selected to be about 160 samples which corresponds to 20 msec of speech at a 8 KHz sampling frequency. This length of the speech segment has been determined to present a good compromise between the requirement to use relatively short segments as to keep the speech signal roughly stationary, and the efficiency of the coding system which generally increases as the delay becomes greater. Dependent on the desired temporal resolution, the delay between time segments can be set to other values, such as 50, 100 or 150 samples.

Figure 3:
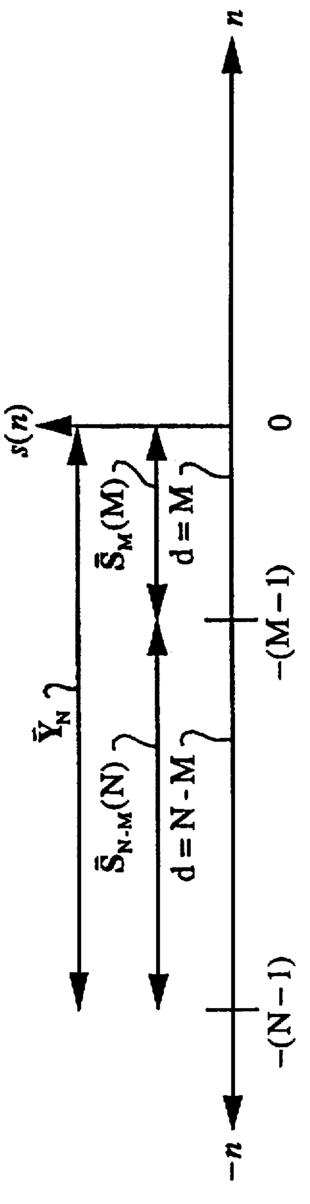
FIG. 3 illustrates the signal sequences of the digitized input signal s(n) which define delayed speech vectors $S_M(M)$ and $S_{N-M}(N)$ used in the encoder of FIG. 2.

A second frame segmenter 125 buffers N-M samples into a vector $S_{N-M}(N)$, the last element of which is delayed by N samples from the current speech sample s(n). FIG. 3 illustrates the relationship between delayed speech vectors $S_M(M)$, $S_{N-M}(N)$ and the digital input speech signal s(n). The function of the delayed vector $S_{N-M}(N)$ will be described in more detail later.

The step following the segmentation of digital input signal s(n) is to decide whether the current segment is voiced or unvoiced, which decision determines the type of applied signal processing. Speech is generally classified as voiced if a fundamental frequency is imported to the air stream by the vocal cords of the speaker. In such case the speech signal is modeled as a superposition of sinusoids which are harmonically related to the fundamental frequency as discussed in more detail next. The determination as to whether a speech segment is voiced or unvoiced, and the estimation of the fundamental frequency can be obtained in a variety of ways known in the art as pitch detection algorithms.

In the system of the present invention, pitch detection block 155 determines whether the speech segment associated with delayed speech vector $S_M(M)$ is voiced or unvoiced. In a specific embodiment, block 155 employs the pitch detection algorithm described in Y. Medan et al., "Super Resolution Pitch Determination of Speech Signals", IEEE Trans. On Signal Processing, Vol. 39, pp 40–48, June 1991, which is incorporated herein by reference. It will be appreciated that other pitch detection algorithms known in the art can be used as well. On output, if the segment is determined to be unvoiced, a flag $f_{v/uv}$ is set equal to zero and if the speech segment is voiced flag $f_{v/uv}$ is set equal to one. Additionally, if the speech segment of delayed speech vector $S_M(M)$ is voiced, pitch detection block 155 estimates its fundamental frequency $F_0$ which is output to parameter encoding block 190.

In the case of an unvoiced speech segment, delayed speech vector $S_M(M)$ is windowed in block 160 by a suitable window W to generate windowed speech vector $S_{WM}(M)$ in which the signal discontinuities to adjacent speech segments at both ends of the speech segment are reduced. Different windows, such as Hamming or Kaiser windows may be used to this end. In a specific embodiment of the present invention, a M-point normalized Hamming window $W_H(M)$ is used, the elements of which are scaled to meet the constraint:

$$1 = \frac{1}{M} \sum_{m=0}^{M-1} W_H^2(m) \qquad (1)$$

Wind owed speech vector $S_{WM}(M)$ is next applied to block 165 for calculating the linear prediction coding (LPC) coefficients which model the human vocal tract. As known in the art, in linear predictive coding the current signal sample s(n) is represented by a combination of the P preceding samples s(n−i), (i=1, . . . , P) multiplied by the LPC coefficients, plus a term which represents the prediction error. Thus, in the system of the present invention, the current sample s(n) is modeled using the auto-regressive model:

$$s(n) = e_n - a_1 s(n-1) - a_2 s(n-2) - \ldots - a_P s(n-P) \qquad (2)$$

where $a_1$, . . . , $a_P$ are the LPC coefficients and $e_n$ is the prediction error. The unknown LPC coefficients which minimize the variance of the prediction error are determined by solving a system of linear equations, as known in the art. A computationally efficient way to solve for the LPC coefficients is given by the Levinson-Durbin algorithm described for example in S. J. Orphanidis, "Optimum Signal Processing," McGraw Hill, New York, 1988, pp. 202–207, which is hereby incorporated by reference. In a preferred embodiment of the present invention the number P of the preceding speech samples used in the prediction is set equal to 10. The LPC coefficients calculated in block 165 are loaded into output vector $a_{op}$. In addition, block 165 outputs the prediction error power $\sigma^2$ for the speech segment which is used in the decoder of the system to synthesize the unvoiced speech segment.

In block 170 vector $a_{op}$, the elements of which are the LPC coefficients, is used to solve for the roots of the homogeneous polynomial equation $$x^P+a_1x^{P-1}+a_2x^{P-2}+\ldots+a_{P-1}X^{P-(P-1)}+a_P=0 \quad (3)$$

which roots can be recognized as the poles of the autoregressive filter modeling the human vocal tract in Eq. (2). The roots computed in block 170 are ordered in terms of increasing phase and are loaded into pole vector $X_p$. The roots of the polynomial equation may be found by suitable root-finding routines, as described for example in Press et al., "Numerical Recipes, The Art of Scientific Computing," Cambridge University Press, 1986, incorporated herein by reference. Alternatively, a computer implementation using an EISPACK set of routines can be used to determine the poles of the polynomial by computing the eigenvalues of the associated characteristic matrix, as used in linear systems theory and described for example in Thomas Kailath, "Linear Systems," Prentice Hall, Inc., Englewood Cliffs, N.J., 1980. The EISPACK mathematical package is described in Smith et al., "Matrix Eigen System Routines—EISPACK Guide," Springer-Verlag, 1976, pp. 28–29. Both publications are incorporated by reference.

Pole vector $X_P$ is next received at vector quantizer block 180 for quantizing it into a codebook entry $X_{VQ}$. While many suitable quantization methods can be used, in a specific embodiment of the present invention, the quantized codebook vector $X_{VQ}$ can be determined using neural networks. To this end, a linear vector quantizing neural network having a Kohonen feature map LVQ1 can be used, as described in T. Kohonen, "Self Organization and Associative Memory," Series in Information, Sciences, Vol. 8, Springer-Verlag, Berlin-Heidelberg, New York, Tokyo, 1984, 2nd Ed. 1988.

It should be noted that the use of the quantized polynomial roots to represent the unvoiced speech segment is advantageous in that the dynamic range of the root values is smaller than the corresponding range for encoding the LPC coefficients thus resulting in a coding gain. Furthermore, encoding the roots of the prediction polynomial is advantageous in that the stability of the synthesis filters can be guaranteed by restricting all poles to be less than unity in magnitude. By contrast, relatively small errors in quantizing the LPC coefficients may result in unstable poles of the synthesis filter.

The elements of the quantized $X_{VQ}$ vector are finally input into parameter encoder 190 to form an unvoiced segment data packet for storage and transmission as described in more detail next.

In accordance with the present invention, processing of the voiced speech segments is executed in blocks 130, 140 and 150. In frame manager block 130 delayed speech vectors $S_M(M)$ and $S_{N-M}(N)$ are concatenated to form speech vector $Y_N$ having a total length of N samples. In this way, an overlap of N-M samples is introduced between adjacent speech segments to provide better continuity at the segment boundaries. For voiced speech segments, the digital speech signal vector $Y_N$ is modeled as a superposition of H harmonics expressed mathematically as follows:

$$s_N(n)=\sum_{h=0}^{H-1} A_H(h)\cdot\sin\left(2\pi(h+1)\frac{F_0}{f_s}n+\theta_h\right)+z_n; \quad (4)$$

$$n=0,1,2,\ldots,N-1.$$

where $A_H(h)$ is the amplitude corresponding to the h-th harmonic, $\theta_h$ is the phase of the h-th harmonic, $F_0$ and $f_s$ are the fundamental and the sampling frequencies respectively, $Z_n$ is unvoiced noise and N is the number of samples in the enlarged speech vector $Y_N$.

To avoid discontinuities of the signal at the ends of the speech segments and problems associated with spectral leakage during subsequent processing in the frequency domain, speech vector $Y_N$ is multiplied in block 140 by a window W to obtain a windowed speech vector $Y_{WN}$. The specific window used in block 140 is a Hamming or a Kaiser window. Preferably, a N point Kaiser window $W_K$ is used, the elements of which are normalized as shown in Eq. (1). The window functions used in the Kaiser and Hamming windows of the present invention are described in Oppenheim et al., "Discrete Time Signal Processing," Prentice Hall, Englewood Hills, N.J., 1989. The elements of vector $Y_{WN}$ are given by the expression:

$$y_{WN}(n)=W_K(n)\cdot y(n);\ n=0,1,2,\ldots,N-1 \quad (5)$$

Vector $Y_{WN}$ is received in super resolution harmonic amplitude estimation (SRHAE) block 150 which estimates the amplitudes of the harmonic frequencies on the basis of the fundamental frequency $F_0$ of the segment obtained in pitch detector 155. The estimated amplitudes are combined into harmonic amplitude vector $A_H$ which is input to parameter encoding block 190 to form voiced data packets.

Parameter encoding block 190 receives on input from pitch detector 155 the $f_{v/uv}$ flag which determines whether the current speech segment is voiced or unvoiced, a parameter E which is related to the energy of the segment, the quantized codebook vector $X_{VQ}$ if the segment is unvoiced, or the fundamental frequency $F_0$ and the harmonic amplitude vector $A_H$ if the segment is voiced. Parameter encoding block 190 outputs for each speech segment a data packet which contains all information necessary to reconstruct the speech at the receiving end of the system.

Figure 4:
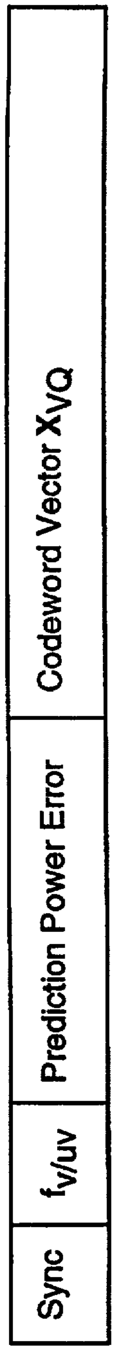
FIGS. 4 and 5 are schematic diagrams of the transmitted parameters in an unvoiced and in a voiced data packet, respectively.
Figure 5:
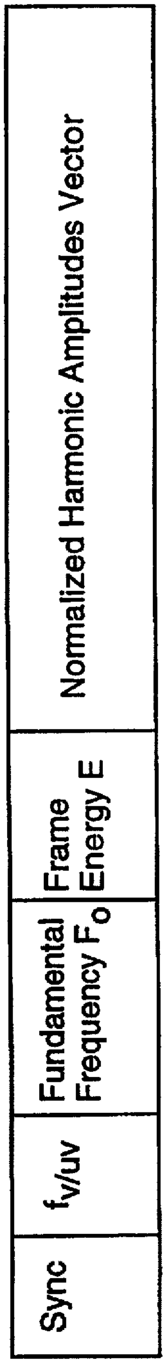

FIGS. 4 and 5 illustrate the data packets used for storage and transmission of the unvoiced and voiced speech segments in accordance with the present invention. Specifically, each data packet comprises control (synchronization) information and flag $f_{v/uv}$ indicating whether the segment is voiced or unvoiced. In addition, each package comprises information related to the energy of the speech segment. In an unvoiced data packet this could be the sum of the squares of all speech samples or, alternatively the prediction error power computed in block 165. The information indicated as the frame energy in the voiced speech segment in FIG. 5 is preferably the sum of the estimated harmonic amplitudes computed in block 150, as described next.

As shown in FIG. 4, if the segment is unvoiced, the corresponding data packet further comprises the quantized vector $X_{VQ}$ determined in vector quantization block 180. If the segment is voiced, the data packet comprises the fundamental frequency $F_0$ and harmonic amplitude vector $A_H$ from block 150, as show in FIG. 5. The number of bits in a voiced data package is held constant and may differ from the number of bits in an unvoiced packet which is also constant.

Figure 6:
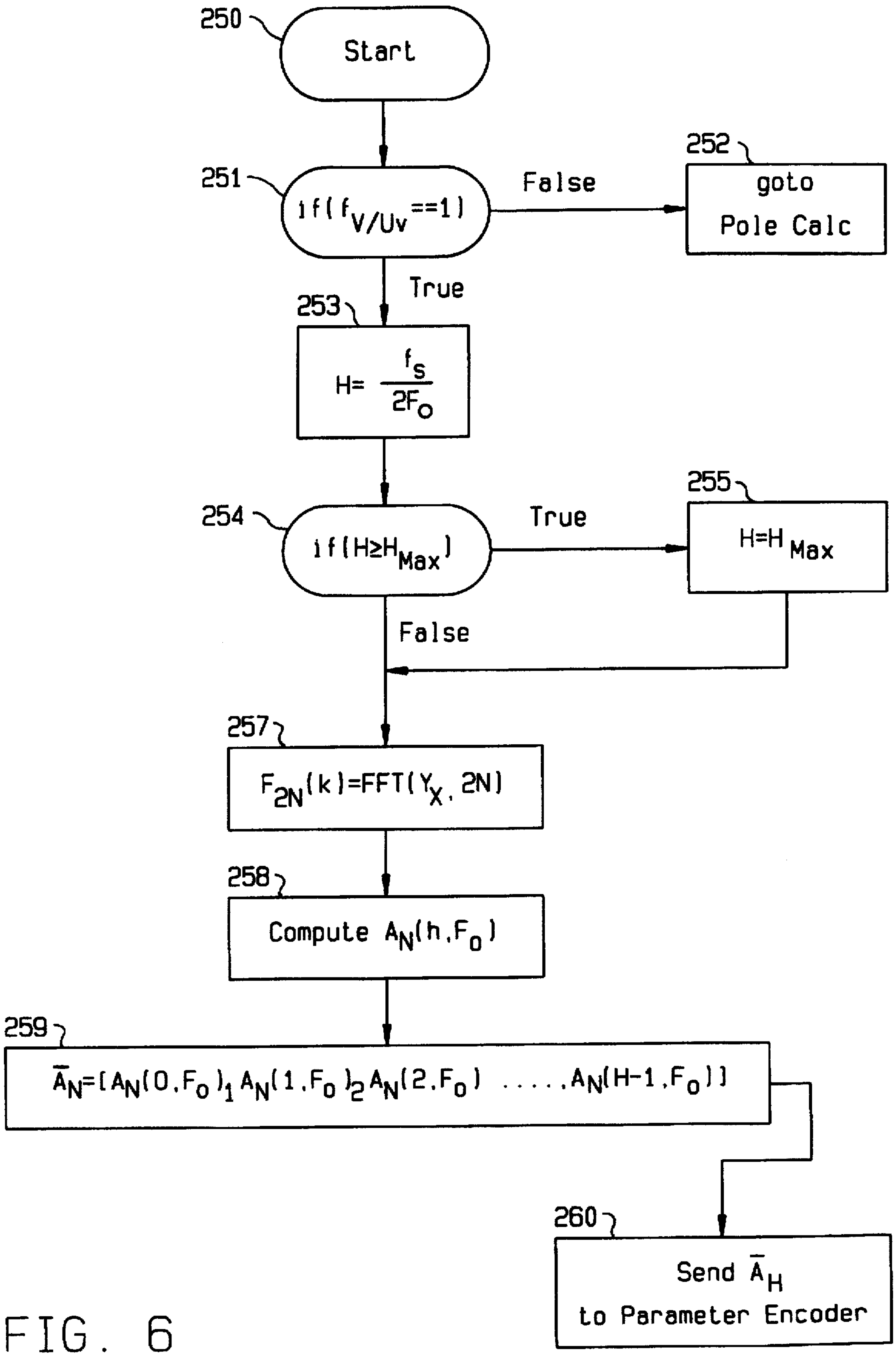
FIG. 6 is a flow diagram of the super resolution harmonic amplitude estimator (SRHAE) used in the encoder in FIG. 2.

The operation of super resolution harmonic amplitude estimation (SRHAE) block 150 is described in greater detail in FIG. 6. In step 250 the algorithm receives windowed vector $Y_{WN}$ and the $f_{v/uv}$ flag from pitch detector 155. In step 251 it is checked whether flag $f_{v/uv}$ is equal to one, which indicates voiced speech. If the flag is not equal to one, in step 252 control is transferred to pole calculation block 170 (see FIG. 2). If flag $f_{v/uv}$ is equal to one, step 253 is executed to determine the total number of harmonics H which is set equal to the integer number obtained by dividing the sampling frequency $f_s$ by twice the fundamental frequency $F_0$. In order to adequately represent a voiced speech segment while keeping the required bit rate low, in the system of the present invention a maximum number of harmonics $H_{max}$ is defined and, in a specific embodiment, is set equal to 30.

In step 254 it is determined whether the number of harmonics H computed in step 253 is greater than or equal to the maximum number of harmonics $H_{max}$ and if true, in step 255 the number of harmonics H is set equal to $H_{max}$. In the following step 257 the input windowed vector $Y_{WN}$ is first padded with N zeros to generate a vector $Y_{2N}$ of length 2N defined as follows:

$$Y_{2N}(n) = Y_{WN}(n) \text{ for } n=0,\ldots,N-1 \qquad (6)$$
$$= 0 \text{ for } n=N,\ldots,2N-1$$

The zero padding operation in step 257 is required in order to obtain the discrete Fourier transform (DFT) of the windowed speech segment in vector $Y_{WN}$ on a more finely divided set of frequencies. It can be appreciated that dependent on the desired frequency separation, a different number of zeros may be appended to windowed speech vector $Y_{WN}$.

Following the zero padding, in step 257 a 2N point discrete Fourier transform of speech vector $Y_{2N}$ is performed to obtain the frequency domain vector $F_{2N}$ from which the desired harmonic amplitudes are determined. Preferably, the computation of the DFT is executed using any fast Fourier transform (FFT) algorithm of length 2N. As well known, the efficiency of the FFT computation increases if the length N of the transform is a power of 2, i.e. if $N=2^L$. Accordingly, in a specific embodiment of the present invention the length 2N of the speech vector $Y_{2N}$ may be adjusted further by adding zeros to meet this requirement. The amplitudes of the harmonic frequencies of the speech segment are calculated next in step 258 in accordance with the formula:

$$A_H(h,F_0)=\frac{1}{N}\cdot\left[2\cdot\sum_{k=\left[(h+1)\frac{2F_0}{f_s}N\right]-B}^{\left[(h+1)\frac{2F_0}{f_s}N\right]+B}\left[\sum_{n=0}^{2N-1}y_{2N}(n)\cdot e^{-j2\pi\frac{k}{2N}n}\right]^2\right]^{\frac{1}{2}}; \qquad (7)$$
$$h=0,1,2,\ldots,H-1;\ H\le\left[\frac{f_s}{2F_0}\right]$$

where $A_H(h,F_0)$ is the estimated amplitude of the h-th harmonic frequency, $F_0$ is the fundamental frequency of the segment and B is the half bandwidth of the main lobe of the Fourier transform of the window function.

Considering Eq. (7) in detail we first note that the expression within the inner square brackets corresponds to the DFT of the windowed vector $Y_{2N}$ which is computed in step 257 and is defined as:

$$F(k)=\sum_{n=0}^{2N-1}y_{2N}(n)e^{-j2\pi\frac{k}{2N}n} \qquad (8)$$

Multiplying each resulting DFT frequency sample F(k) by its complex conjugate quantity F*(k) gives the power spectrum P(k) of the input signal at the given discrete frequency sample:

$$P(k)=F(k)\cdot F^*(k) \qquad (9)$$

which operation is mathematically expressed in Eq.(7) by taking the square of the discrete Fourier transform frequency samples F(k). Finally, in Eq.(7) the harmonic amplitude $A_H(h,F_0)$ is obtained by adding together the power spectrum estimates for the B adjacent discrete frequencies on each side of the respective harmonic frequency h, and taking the square root of the result, scaling it appropriately.

As indicated above, B is the half bandwidth of the discrete Fourier transform of the Kaiser window used in block 140. For a window length N=512 the main lobe of a Kaiser window has 11 samples, so that B can be rounded conveniently to 5. Since the windowing operation in block 140 corresponds in the frequency domain to the convolution of the respective transforms of the original speech segment and that of the window function, using all samples within the half bandwidth of the window transform results in an increased accuracy of the estimates for the harmonic amplitudes.

Once the harmonic amplitudes $A_H(h,F_0)$ are computed, in step 259 the sequence of amplitudes is combined into harmonic amplitude vector $A_H$ which is sent to the parameter encoder in step 260.

Figure 7A:
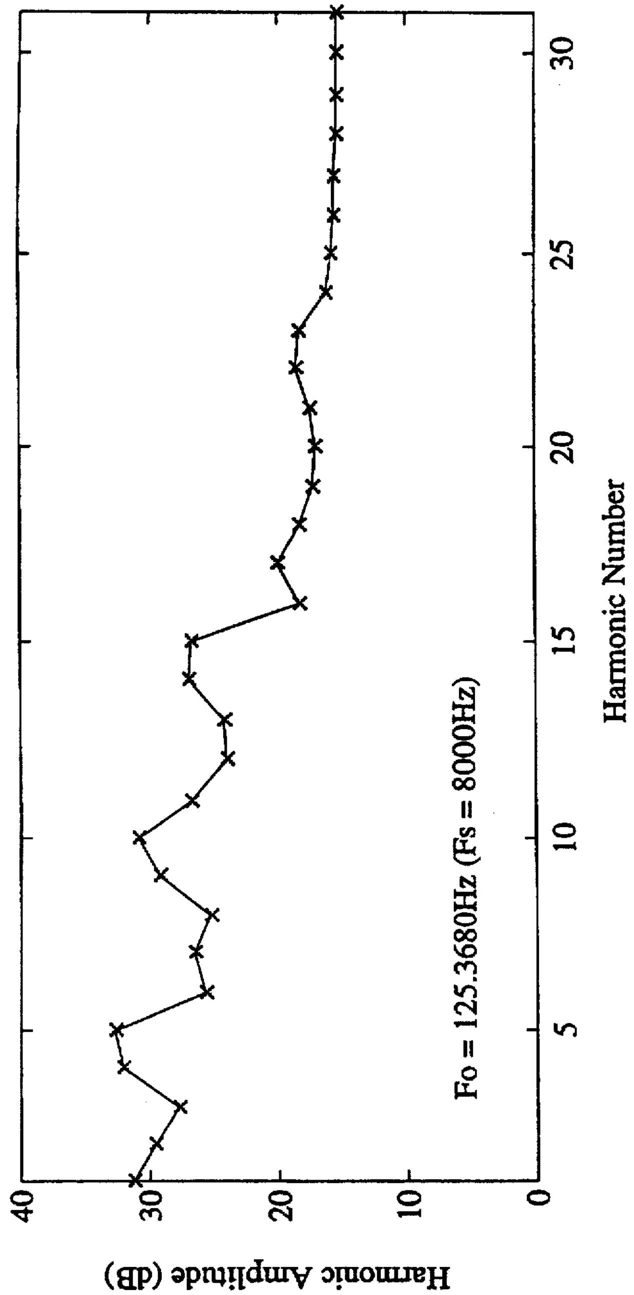
FIGS. 7A is a graph of the actual and the estimated harmonic amplitudes in a voiced speech segment.
Figure 7B:
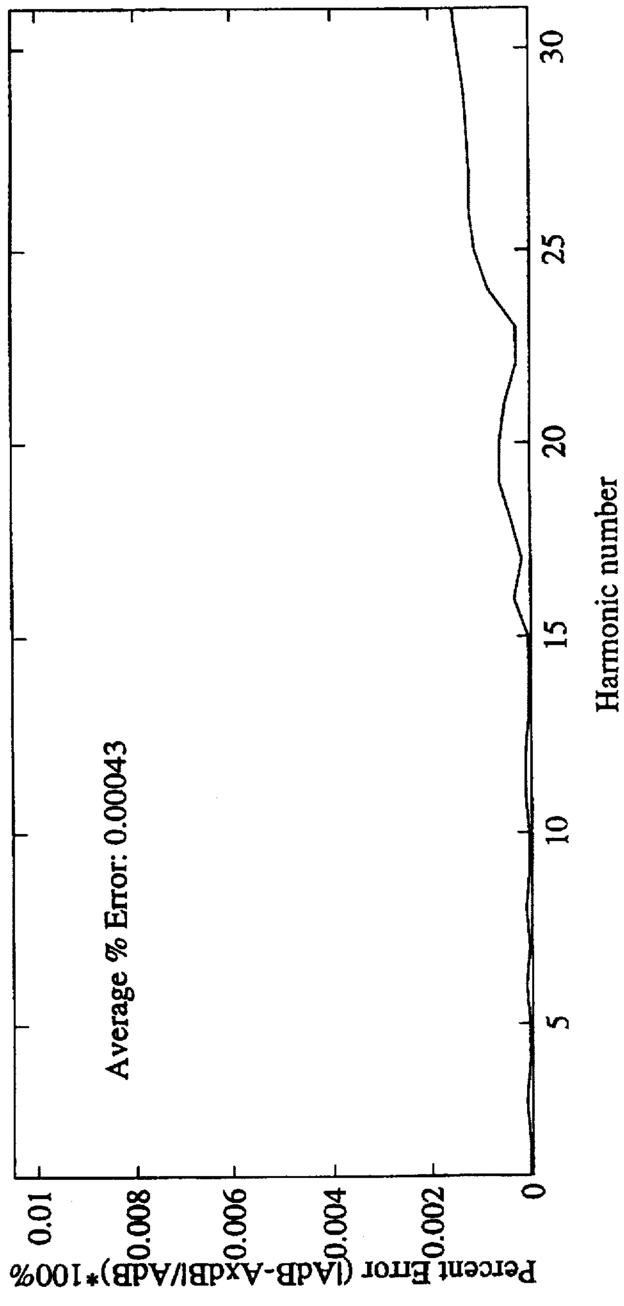
FIG. 7B illustrates the normalized estimation error in percent % dB for the harmonic amplitudes of the speech segment in FIG. 7A.

FIG. 7A illustrates for comparison the harmonic amplitudes measured in an actual speech segment and the set of harmonic amplitudes estimated using the SRHAE method of the present invention. In this figure, a maximum number $H_{max}$=30 harmonic frequencies were used to represent an input speech segment with fundamental frequency $F_0$=125.36 Hz. A normalized Kaiser window and zero padding as discussed above were also used. The percent error between the actual and estimated harmonic amplitudes is plotted in FIG. 7B and indicates very good estimation accuracy. The expression used to compute the percent error in FIG. 7B is mathematically expressed as:

$$E(h)=\frac{|A_H(h,F_0)-\hat{A}_H(h,F_0)|}{|A_H(h,F_0)|}\cdot 100\%;\ \text{for } h=0,\ldots,H-1. \qquad (10)$$

The results indicate that SRHAE block 150 of the present invention is capable of providing an estimated sequence of harmonic amplitudes $A_H(h,F_0)$ accurate to within 1000-th of a percent. Experimentally it has also been found that for a higher fundamental frequency $F_0$ the percent error over the total range of harmonics can be reduced even further.

B. The Decoder Block

Figure 8:
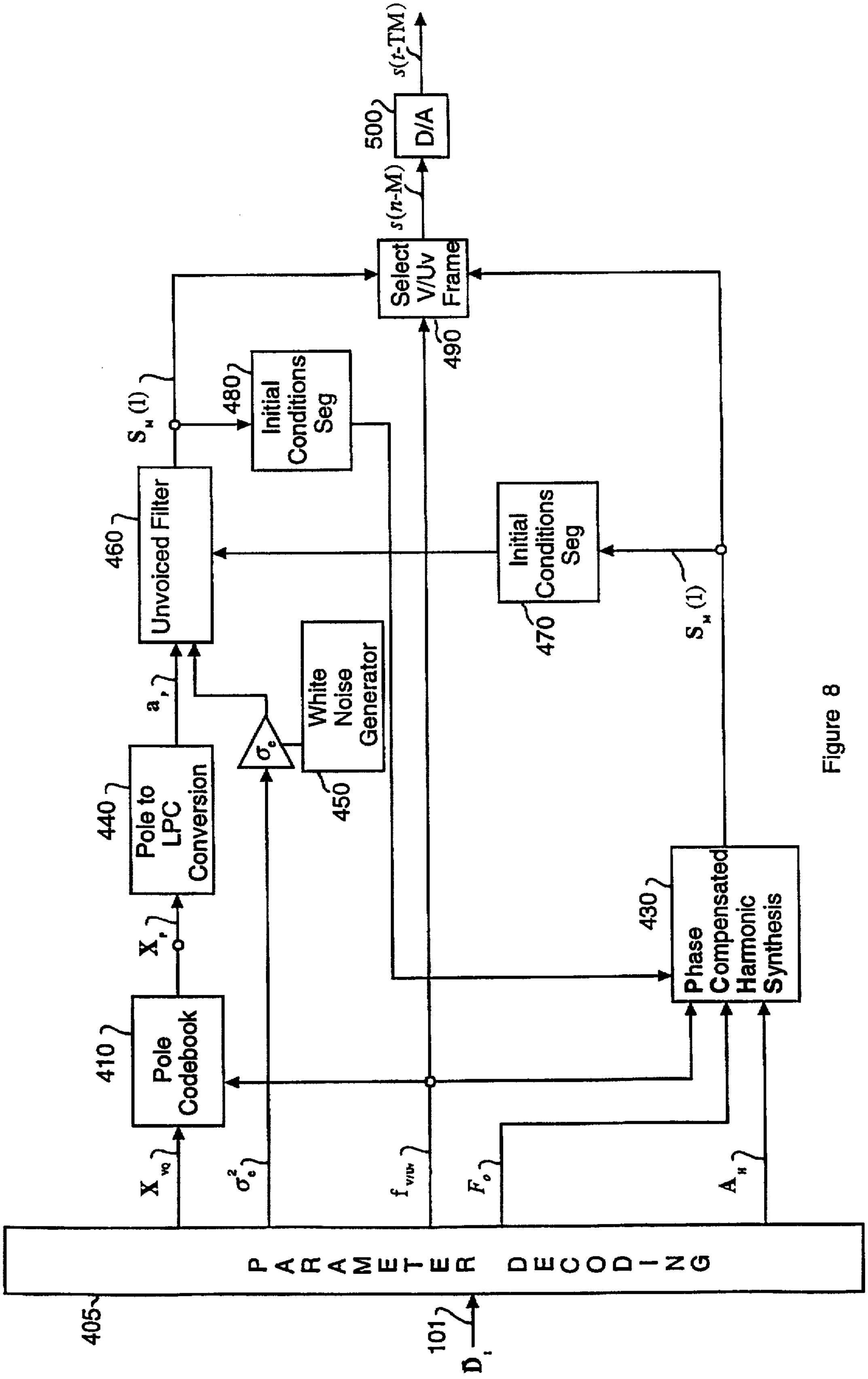
FIG. 8 is a schematic block diagram of the decoder used in the system of FIG. 1.

FIG. 8 is a schematic block diagram of speech decoder 400 in FIG. 1. Parameter decoding block 405 receives data packets 25 via communications channel 101. As discussed above, data packets 25 correspond to either voiced or unvoiced speech segments as indicated by flag $f_{v/uv}$. Additionally, data packets 25 comprise a parameter related to the segment energy E; the fundamental frequency $F_0$ and the estimated harmonic amplitudes vector $A_H$ for voiced packets; and the quantized pole vector $X_{VQ}$ for unvoiced speech segments.

If the current data packet 25 is unvoiced, the speech synthesis proceeds in blocks 410 through 460. Specifically, block 410 receives the quantized poles vector $X_{VQ}$ and uses a pole codebook look up table to determine a poles vector $X_p$ which corresponds most closely to the received vector $X_{VQ}$. In block 440 vector $X_p$ is converted into a LPC coefficients vector $a_P$ of length P. Unvoiced synthesis filter 460 is next initialized using the LPC coefficients in vector $a_P$. The unvoiced speech segment is synthesized by passing to the synthesis filter 460 the output of white noise generator 450 which output is gain adjusted on the basis of the transmitted prediction error power $\sigma_e$. The operation of blocks 440, 450 and 460 defining the synthesis of unvoiced speech using the corresponding LPC coefficients is known in the art and need not be discussed in further detail. Digital-to-analog converter 500 completes the process by transforming the unvoiced speech segment to analog speech signal.

Figure 9:
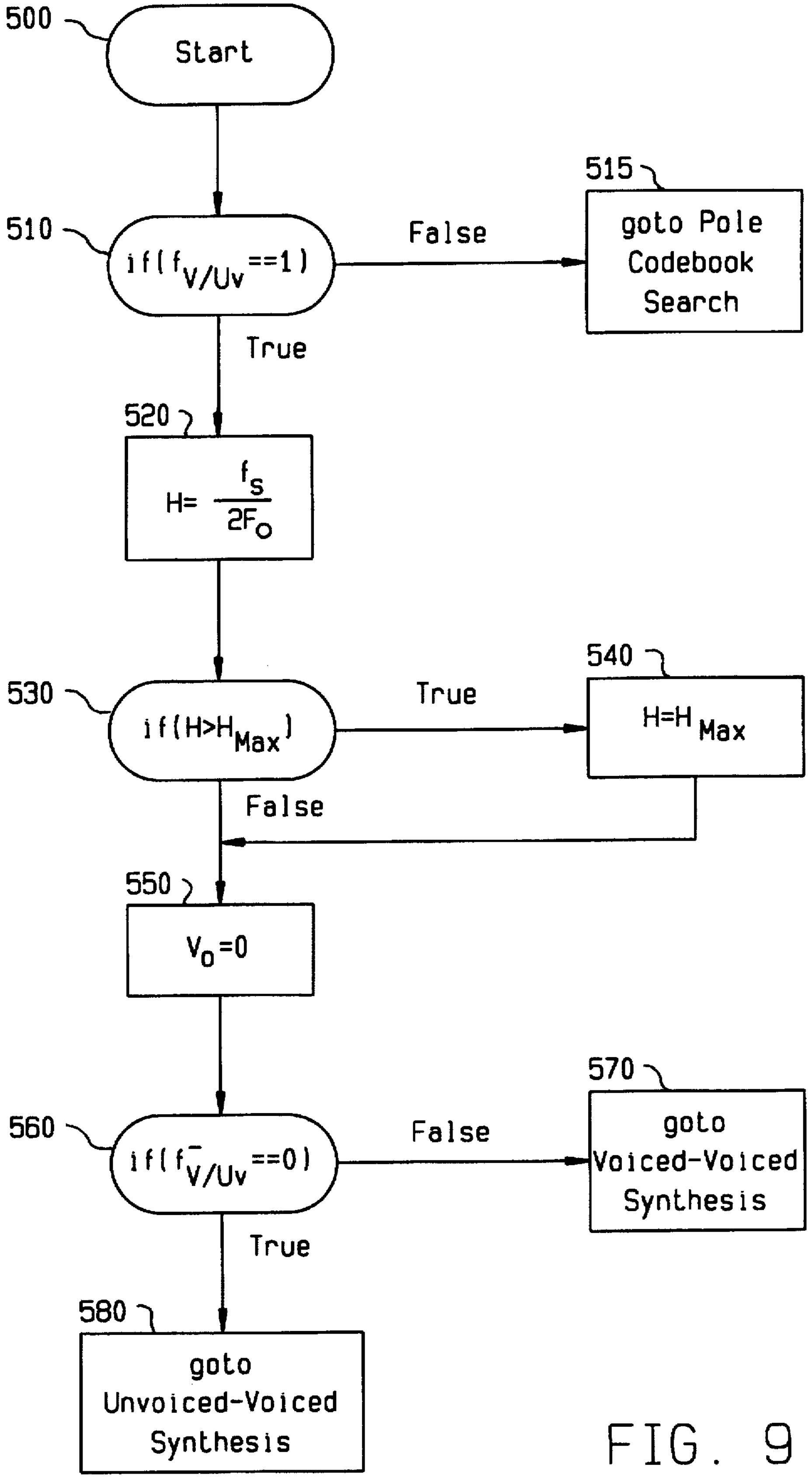
FIG. 9 is a flow diagram of the phase compensated harmonic synthesizer in FIG. 8.

The synthesis of voiced speech segments and the concatenation of segments into a continuous voice signal is accomplished in the system of the present invention using phase compensated harmonic synthesis block 430. The operation of synthesis block 430 is shown in greater detail in the flow diagram in FIG. 9. Specifically, in step 500 the synthesis algorithm receives input parameters from the parameter decoding block 405 which includes the $f_{v/uv}$ flag, the fundamental frequency $F_0$ and the normalized harmonic amplitudes vector $A_H$. In step 510 it is determined whether the received data packet is voiced or unvoiced as indicated by the value of flag $f_{v/uv}$. If this value is is not equal to one, in step 515 control is transferred to pole codebook search block 410 for processing of an unvoiced segment.

If flag $f_{v/uv}$ is equal to one, indicating a voiced segment, in step 520 is calculated the number of harmonics H in the segment by dividing the sampling frequency $f_s$ of the system by twice the fundamental frequency $F_0$ for the segment. The resulting number of harmonics H is truncated to the value of the closest smaller integer.

Decision step 530 compares next the value of the computed number of harmonics H to the maximum number of harmonics $H_{max}$ used in the operation of the system. If H is greater than $H_{max}$, in step 540 the value of H is set equal to $H_{max}$. In the following step 550 the elements of the voiced segment synthesis vector $V_0$ are initialized to zero.

In step 560 the voiced/unvoiced flag $f^-_{v/uv}$ of previous segment is examined to determine whether the segment was voiced, in which case control is transferred in step 570 to the voiced-voiced synthesis algorithm. If the previous segment was unvoiced, control is transferred to the unvoiced-voiced synthesis algorithm. Generally, the last sample of the previous speech segment is used as the initial condition in the synthesis of the current segment as to insure amplitude continuity in the signal transition ends.

In accordance with the present invention, voiced speech segments are concatenated subject to the requirement of both amplitude and phase continuity across the segment boundary. This requirement contributes to a significantly reduced distortion and a more natural sound of the synthesized speech. Clearly, if two segments have identical number of harmonics with equal amplitudes and frequencies, the above requirement would be relatively simple to satisfy. However, in practice all three parameters can vary and thus need to be matched separately.

In the system of the present invention, if the numbers of harmonics in two adjacent voiced segments are different, the algorithm proceeds to match the smallest number H of harmonics common to both segments. The remaining harmonics in any segment are considered to have zero amplitudes in the adjacent segment.

Figure 10A:
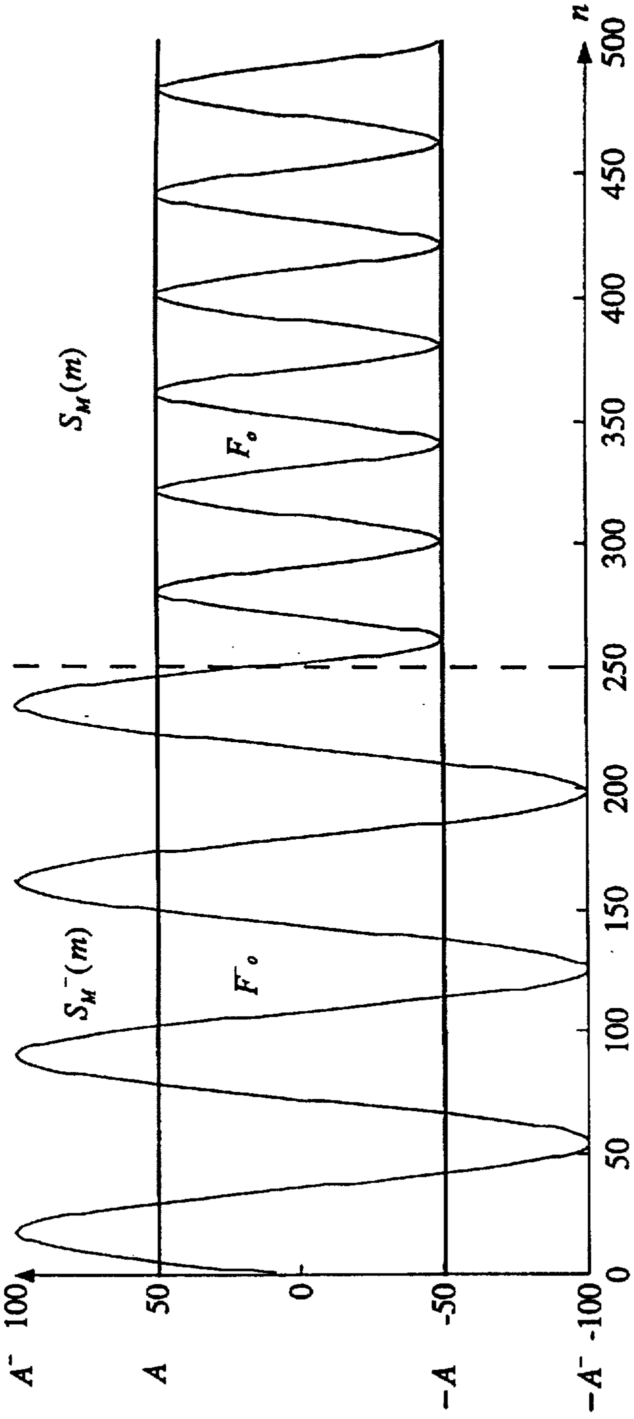
FIGS. 10 A, 10 B illustrate of the harmonics matching problem in the system of the present invention.
Figure 10B:
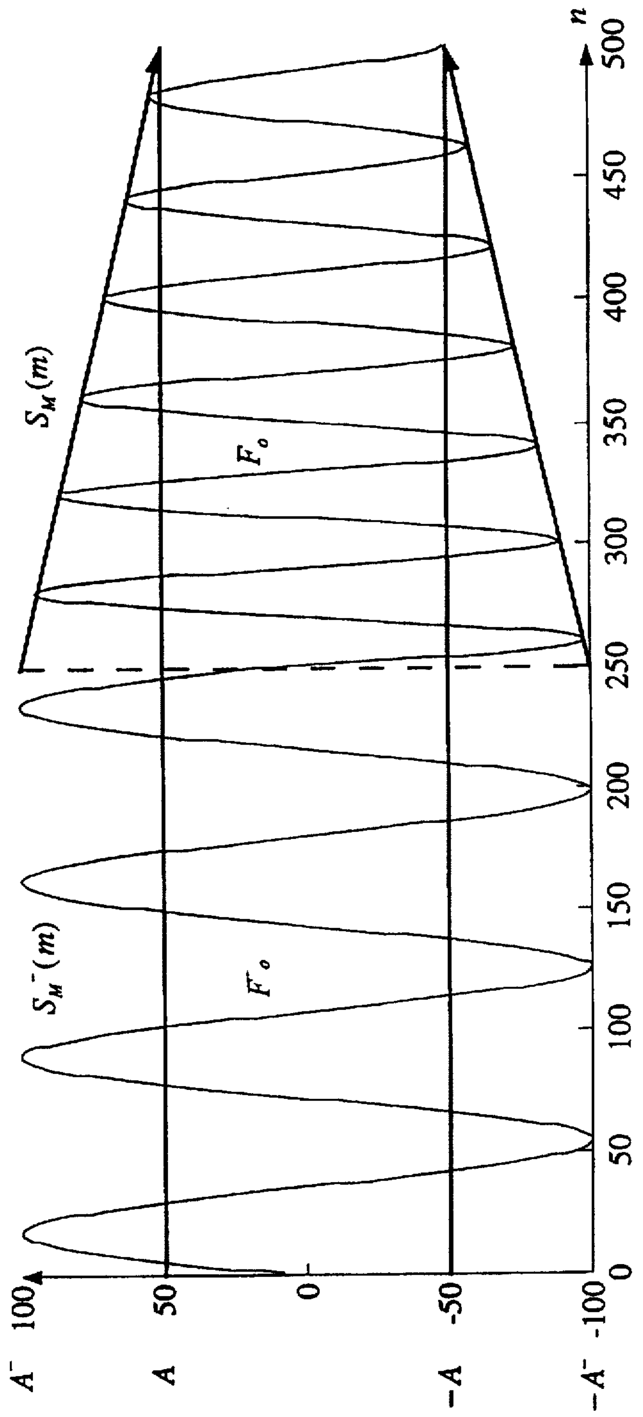

The problem of harmonics matching is illustrated in FIG. 10 where two sinusoidal signals $s^-(n)$ and s(n) having different amplitudes $A^-$ and A and fundamental frequencies $F^-_0$ and $F_0$ have to be matched at the boundary of two adjacent segments of length M. In accordance with the present invention, the amplitude discontinuity is resolved by means of a linear amplitude interpolation such that at the beginning of the segment the amplitude of the signal S(n) is set equal to $A^-$ while at the end it is equal to the harmonic amplitude A. Mathematically this condition is expressed as $$A^-(m)+\frac{A(m)-A^-(m)}{M} \tag{11}$$

where M is the length of the speech segment.

In the more general case of H harmonic frequencies the current segment speech signal may be represented as follows:

$$S(m)=\sum_{h=0}^{H-1}\left(A^-(m)+\frac{A(m)-A^-(m)}{M}\cdot m\right)\sin((h+1)\Phi(m)+\xi(h)); \tag{12}$$

$$m=0,\ldots,M-1.$$

where $\Phi(m)=2\pi\, m\, F_0/f_s$; and $\xi(h)$ is the initial phase of the h-th harmonic. Assuming that the amplitudes of each two harmonic frequencies to be matched are equal, the condition for phase continuity may be expressed as an equality of the arguments of the sinusoids in Eq. (12) evaluated at the first sample of the current speech segment. This condition can be expressed mathematically as:

$$\begin{aligned}(h+1)\Phi(0)+\xi(h) &= (h+1)\,\Phi^-(M)+\xi^-(h)\\ \xi(h) &= \Phi^-(M)+\xi-(h);\ \text{for } h=0,\ldots,H-1\end{aligned} \tag{13}$$

where $\Phi^-$ and $\xi^-$ denote the phase components for the previous segment and term $2\pi$ has been omitted for convenience. Since at m=0 the quantity $\Phi(m)$ is always equal to zero, Eq. (13) gives the condition to initialize the phases of all harmonics.

Figure 11A:
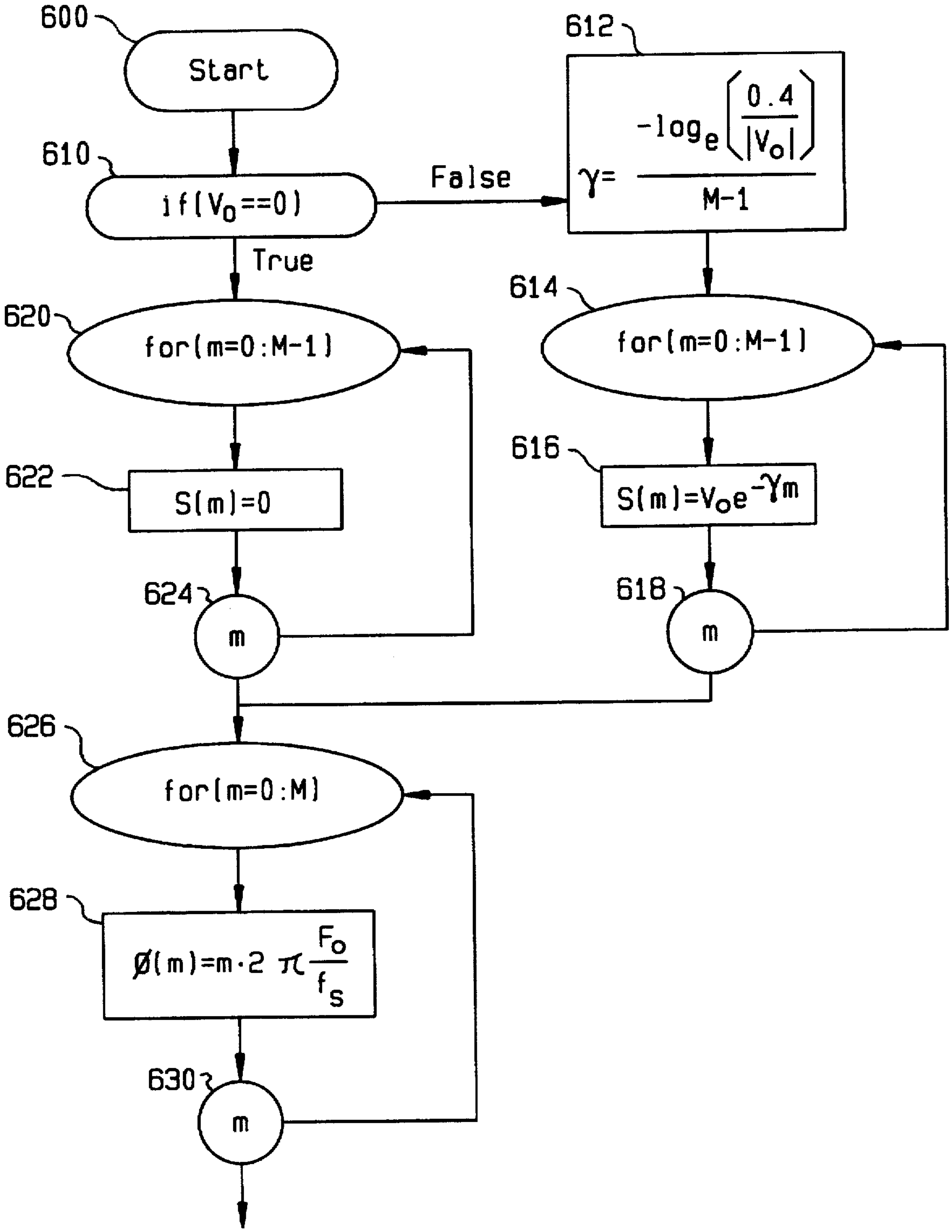
FIG. 11 is a flow diagram of the voiced to voiced speech synthesis algorithm.
Figure 11B:
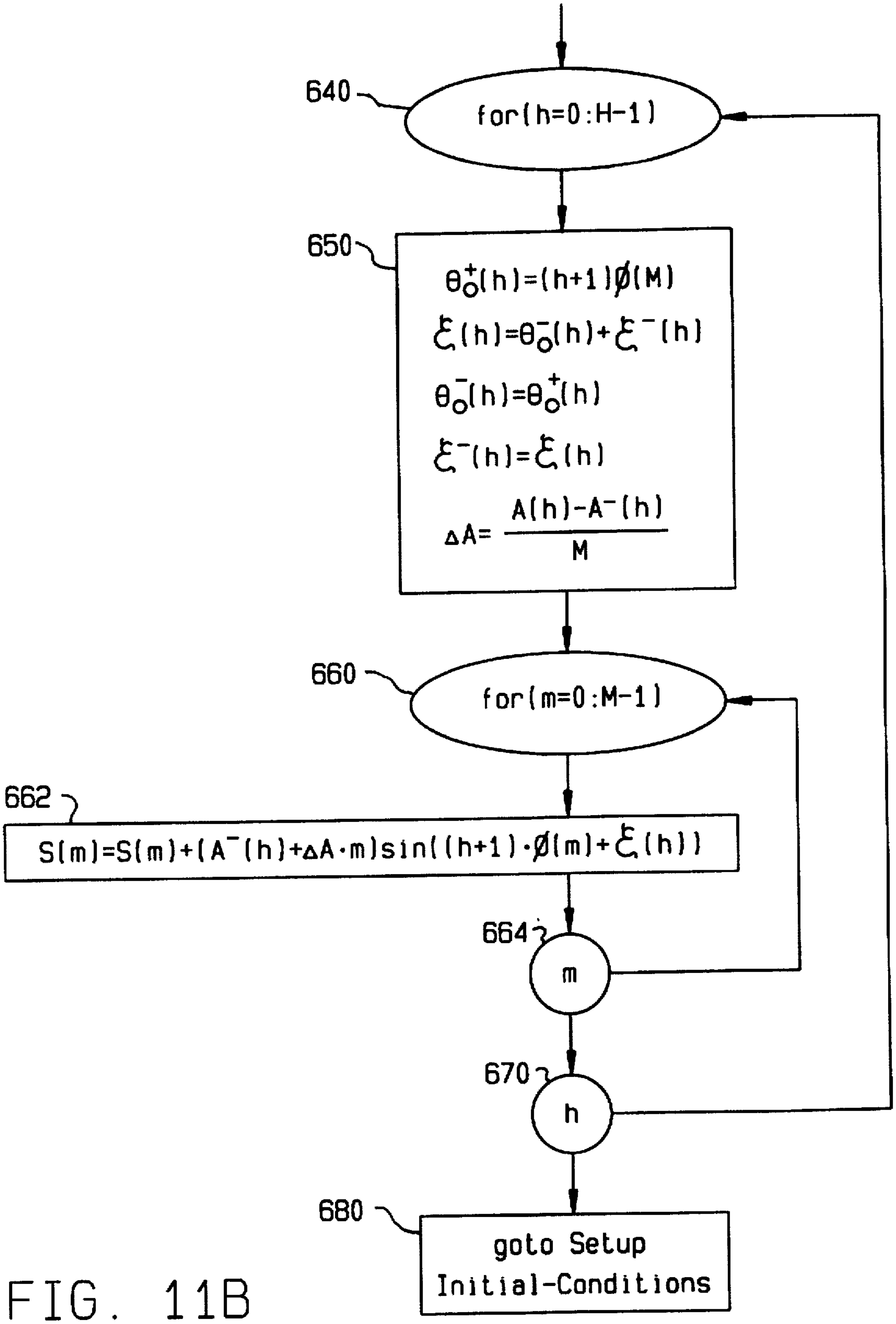

FIG. 11 is a flow diagram of the voiced-voiced synthesis block of the present invention which implements the above algorithm. Following the start step 600 in step 610 the system checks whether there is a DC offset $V_0$ in the previous segment which has to be reduced to zero. If there is no such offset, in steps 620, 622 and 624 the system initializes the elements of the output speech vector to zero. If there is a DC offset, in step 612 the system determines the value of an exponential decay constant $\gamma$ using the expression:

$$\gamma=\frac{-\log\left(\frac{0.4}{|V_0|}\right)}{M-1} \tag{14}$$

where $V_0$ is the DC offset value.

In steps 614, 616 and 618 the constant $\gamma$ is used to initialize the output speech vector S(m) with an exponential decay function having a time constant equal to $\gamma$. The elements of speech vector S(m) are given by the expression:

$$S(m)=V_0e^{-\gamma m} \tag{15}$$

Following the initialization of the speech output vector, the system computes in steps 626, 628 and 630 the phase line $\phi(m)$ for time samples 0, . . . , M.

In steps 640 through 670 the system synthesizes a segment of voiced speech of length M samples which satisfies the conditions for amplitude and phase continuity to the previous voiced speech segment. Specifically, step 640 initializes a loop for the computation of all H harmonic frequencies. In step 650 the system sets up the initial conditions for the amplitude and space continuity for each harmonic frequency as defined in Eqs. (11)–(13) above.

In steps 660, 662 and 664 the system loops through all M samples of the speech segment computing the synthesized voiced segment in step 662 using Eq. (12) and the initial conditions set up in step 650. When the synthesis signal is computed for all M points of the speech segment and all H harmonic frequencies, following step 670 control is transferred in step 680 to initial conditions block 800.

The unvoiced-to-voiced transition in accordance with the present invention is determined using the condition that the last sample of the previous segment $S^{-}(N)$ should be equal to the first sample of the current speech segment S(N+1), i.e. $S^{-}(N)=S(N+1)$. Since the current segment is voiced, it can be modeled as a superposition of harmonic frequencies so that the condition above can be expressed as: where $A_i$ is the i-th harmonics amplitude, $\phi_i$ and $\theta_i$ are the i-th harmonics phase and initial phase, $$S(N)=A_1(\phi_1+\theta_1)+A_2(\phi_2+\theta_2)+\ldots+A_{H-1}\sin(\phi_{H-1}+\theta_{H-1})+\xi. \quad (16)$$

respectively, and $\xi$ is an offset term modeled as an exponential decay function, as described above. Neglecting for a moment the $\xi$ term and assuming that at time n=N+1 all harmonic frequencies have equal phases, the following condition can be derived:

$$S(N) = \alpha[A_0+A_1+\ldots+A_{H-1}) \rightarrow \quad (17)$$

$$\alpha = \frac{S(N)}{\sum_{i=0}^{H-1} A_i} = \sin(\phi_i+\theta_i);\ i=0,\ldots,H-1.$$

where it is assumed that $|\alpha|<1$. This set of equations yields the initial phases of all harmonics at sample n=N+1, which are given by the following expression:

$$\theta_i=\sin^{-1}(\alpha)-\phi_i;\ \text{for } i=0,\ldots,H-1. \quad (18)$$

Figure 12A:
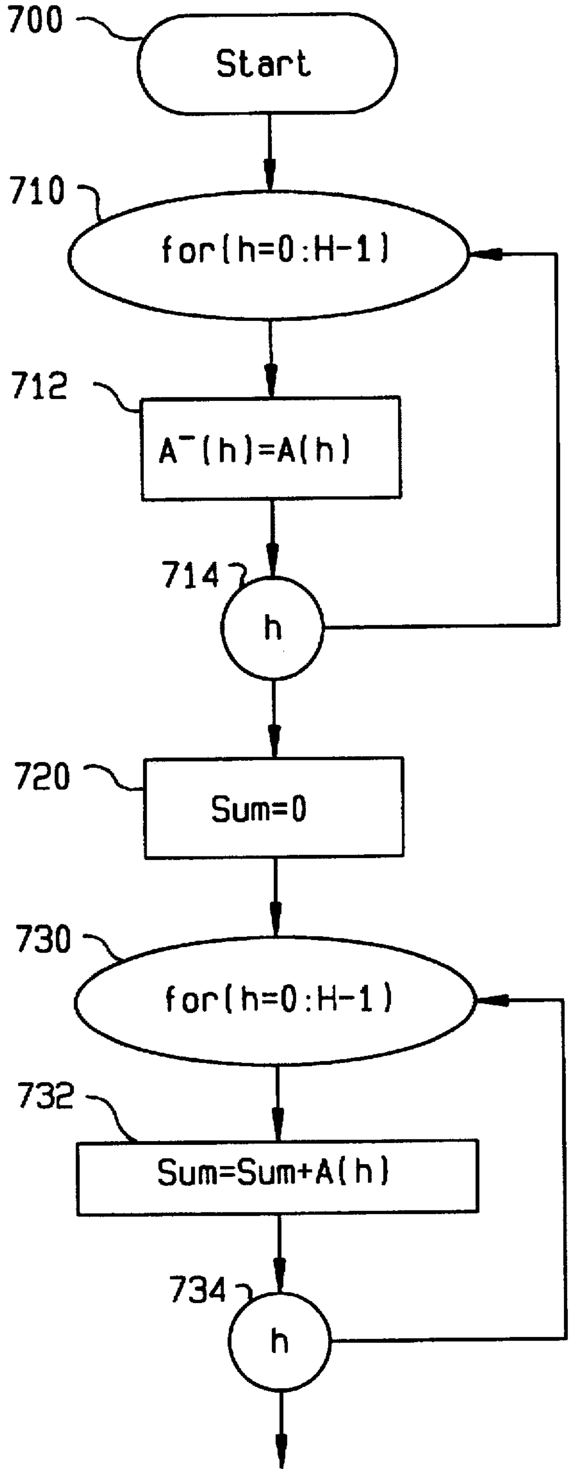
FIG. 12 is a flow diagram of the unvoiced to voiced speech synthesis algorithm.
Figure 12B:
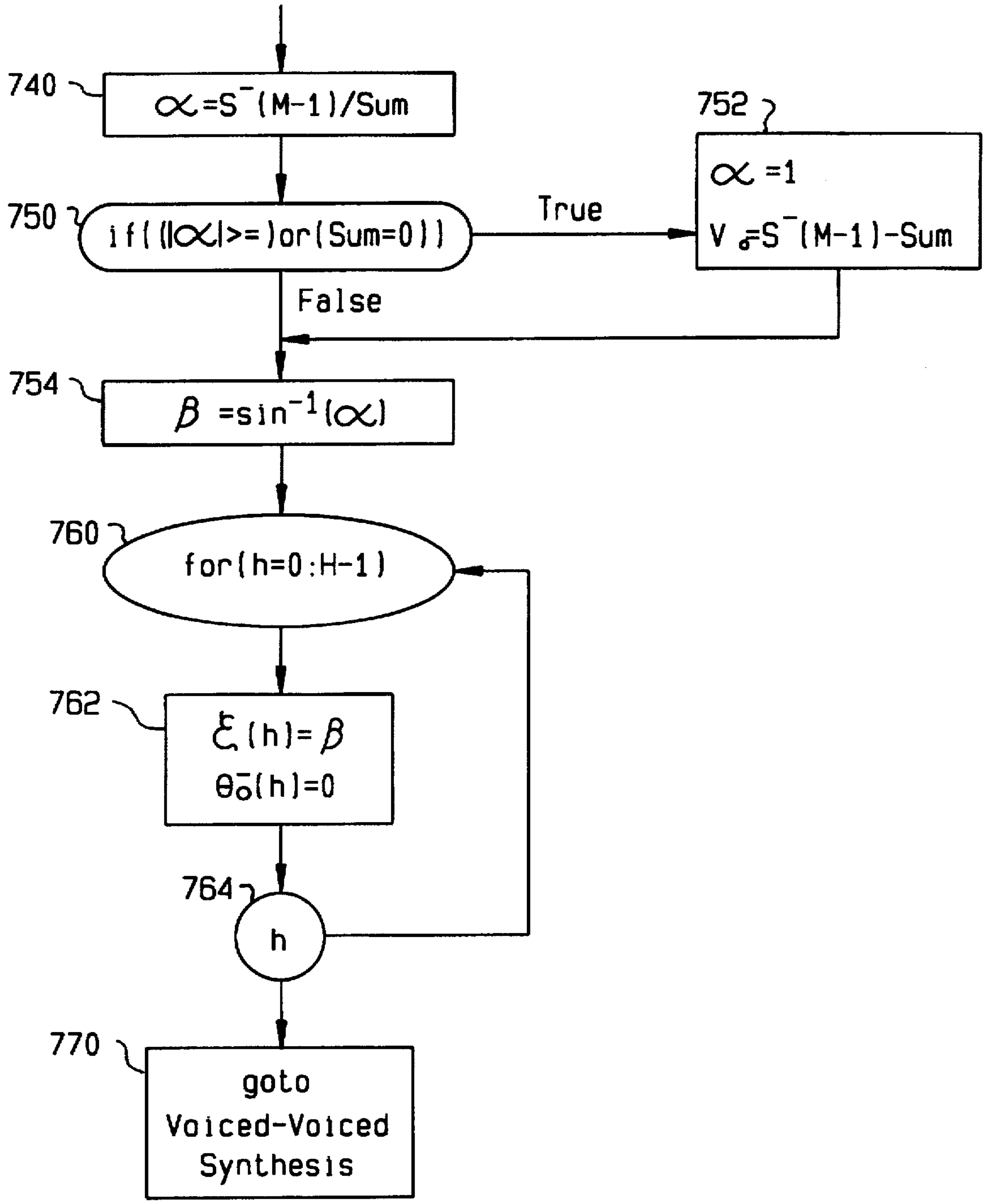

FIG. 12 is a flow diagram of the unvoiced-voiced synthesis block which implements the above algorithm. In step 700 the algorithm starts, following an indication that the previous speech segment was unvoiced. In steps 710 to 714 the vector comprising the harmonic amplitudes of the previous segment is updated to store the harmonic amplitudes of the current voiced segment.

In step 720 a variable sum is set equal to zero and in the following steps 730, 732 and 734 the algorithm loops through the number of harmonic frequencies H adding the estimated amplitudes until the variable Sum contains the sum of all amplitudes of the harmonic frequencies. In the following step 740, the system computes the value of the parameter $\alpha$ after checking whether the sum of all harmonics is not equal to zero. In steps 750 and 752 the value of $\alpha$ is adjusted, if $|\alpha|>1$. Next, in step 754 the algorithm computes the constant phase offset $\beta=\sin^{-1}(\alpha)$. Finally, in steps 760, 762 and 764 the algorithm loops through all harmonics to determine the initial phase offset $\theta_i$ for each harmonic frequency.

Figure 13:
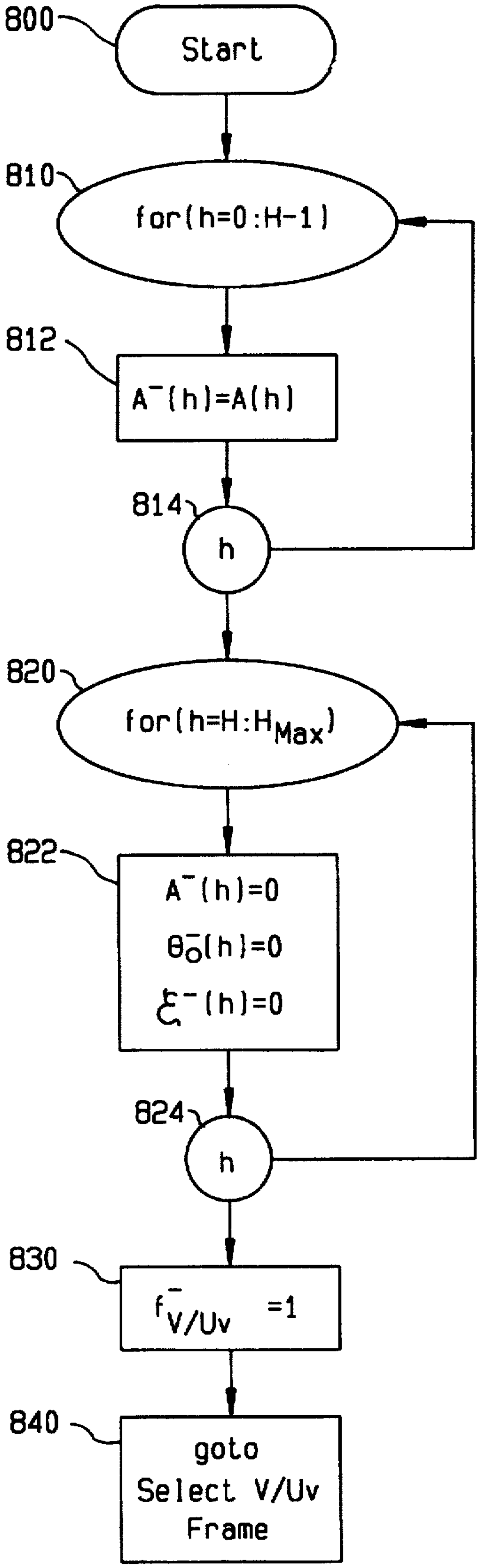
FIG. 13 is a flow diagram of the initialization of the system with the parameters of the previous speech segment.

Following the synthesis of the speech segment, the system of the present invention stores in a memory the parameters of the synthesized segment to enable the computation of the amplitude and phase continuity parameters used in the following speech frame. The process is illustrated in a flow diagram form in FIG. 13 where in step 800 the amplitudes and phases of the harmonic frequencies of the voiced frame are loaded. In steps 810 to 814 the system updates the values of the H harmonic amplitudes actually used in the last voiced frame. In steps 820 to 824 the system sets the values for the parameters of the unused $H_{max}$–H harmonics to zero. In step 830 the voiced/unvoiced flag $f_{v/uv}$ is set equal to one, indicating the previous frame was voiced. The algorithm exits in step 840.

The method and system of the present invention provide the capability of accurately encoding and synthesizing voiced and unvoiced speech at a minimum bit rate. The invention can be used in speech compression for representing speech without using a library of vocal tract models to reconstruct voiced speech. The speech analysis used in the encoder of the present invention can be used in speech enhancement for enhancing and coding of speech without the use of a noise reference signal. Speech recognition and speaker recognition systems can use the method of the present invention for modeling the phonetic elements of language. Furthermore, the speech analysis and synthesis method of this invention provide natural sounding speech which can be used in artificial synthesis of a user's voice.

The method and system of the present invention may also be used to generate different sound effects. For example, changing the pitch frequency $F_0$ and/or the harmonic amplitudes in the decoder block will have the perceptual effect of altering the voice personality in the synthesized speech with no other modifications of the system being required. Thus, in some applications while retaining comparable levels of intelligibility of the synthesized speech the decoder block of the present invention may be used to generate different voice personalities. A separate type of sound effects may be created if the decoder block uses synthesis frame sizes different from that of the encoder. In such case, the synthesized time segments will be expanded or contracted in time compared to the originals, changing their perceptual quality. The use of different frame sizes at the input and the output of an digital system, known in the art as time warping, may also be employed in accordance with the present invention to control the speed of the material presentation, or to obtain a better match between different digital processing systems.

It should further be noted that while the method and system of the present invention have been described in the context of speech processing, they are also applicable in the more general context of audio processing. Thus, the input signal of the system may include music, industrial sounds and others. In such case, dependent on the application, it may be necessary to use sampling frequency higher or lower than the one used for speech, and also adjust the parameters of the filters in order to adequately represent all relevant aspects of the input signal. When applied to music, it is possible to bypass the unvoiced segment processing portions of the encoder and the decoder of the present system and merely transmit or store the harmonic amplitudes of the input signal for subsequent synthesis. Furthermore, harmonic amplitudes corresponding to different tones of a musical instrument may also be stored at the decoder of the system and used independently for music synthesis. Compared to conventional methods, music synthesis in accordance with the method of the present invention has the benefit of using significantly less memory space as well as more accurately representing the perceptual spectral content of teh audio signal.

While the invention has been described with reference to a preferred embodiment, it will be appreciated by those of ordinary skill in the art that modifications can be made to the structure and form of the invention without departing from its spirit and scope which is defined in the following claims.

I claim:

1. A method for processing an audio signal comprising the steps of:

dividing the signal into segments, each segment representing one of a succession of time intervals;

detecting for each segment the presence of a fundamental frequency;

if such a fundamental frequency is detected, estimating the amplitudes of a set of sinusoids harmonically related to the detected fundamental frequency, the set of sinusoids being representative of the signal in the time segment; and encoding for subsequent storage and transmission the set of the estimated harmonic amplitudes, each amplitude being normalized by the sum of all amplitudes.

2. The method of claim 1 wherein the audio signal is a speech signal and following the step of detecting the method further comprises the step of determining whether a segment represents voiced or unvoiced speech on the basis of the detected fundamental frequency.

3. The method of claim 2 further comprising the steps of:

computing a set of linear predictive coding (LPC) coefficients for each segment determined to be unvoiced; and encoding the LPC coefficients by computing the roots of a LPC coefficients polynomial.

4. The method of claim 3 further comprising the step of encoding the linear prediction error power associated with the computed LPC coefficients.

5. The method of claim 4 wherein the step of encoding the LPC coefficients comprises the step of computing the roots of a LPC coefficients polynomial and encoding the computed polynomial roots.

6. The method of claim 5 wherein the step of encoding the computed polynomial roots comprises the steps of: forming a vector of the computed polynomial roots; and vector quantizing the formed vector using a neural network to determine a vector codebook entry.

7. The method of claim 5 further comprising the step of forming a data packet corresponding to each unvoiced segment for subsequent transmission or storage, the packet comprising a flag indicating that the speech segment is unvoiced, the vector codebook entry for the roots of the LPC coefficients polynomial and the linear prediction error power associated with the computed LPC coefficients.

8. The method of claim 3 wherein each segment determined to be unvoiced is windowed with a normalized Hamming window prior to the step of computing the LPC coefficients.

9. The method of claim 2 wherein the step of estimating harmonic amplitudes comprises the steps of:

performing a discrete Fourier transform (DFT) of the speech signal; and computing a root sum square of the samples of the power DFT of said speech signal in the neighborhood of each harmonic frequency to obtain an estimate of the corresponding harmonic amplitude.

10. The method of claim 9 wherein prior to the step of performing a DFT the speech signal is windowed by a window function providing reduced spectral leakage.

11. The method of claim 10 wherein the used window is a normalized Kaiser window.

12. The method of claim 10 wherein the computation of the DFT is accomplished using a fast Fourier transform (FFT) of the windowed segment.

13. The method of claim 10 wherein the estimates of the harmonic amplitudes $A_H(h,F_0)$ are computed according to the equation:

$$A_H(h,F_0)=\frac{1}{N}\cdot\left[2\cdot\sum_{k=\left[(h+1)\frac{2F_0}{f_s}N\right]-B}^{\left[(h+1)\frac{2F_0}{f_s}N\right]+B}\left[\sum_{n=0}^{2N-1}y_{2N}(n)\cdot e^{-j2\pi\frac{k}{2N}\cdot n}\right]^2\right]^{\frac{1}{2}}$$

$$h=0,1,2,\ldots,H-1;\ H\leq\left[\frac{f_s}{2F_0}\right]$$

where $A_H(h,F_0)$ is the estimated amplitude of the h-th harmonic frequency; $F_0$ is the fundamental frequency; B is the half bandwidth of the main lobe of the Fourier transform of the window function; and $Y_{2N}(n)$ is the windowed input signal padded with N zeros.

14. The method of claim 13 wherein following the computation of the harmonic amplitudes $A_H(h,F_0)$ each amplitude is normalized by the sum of all amplitudes and is encoded to obtain a harmonic amplitude vector having H elements representative of the signal segment.

15. The method of claim 14 further comprising the step of forming a data packet corresponding to each voiced segment for subsequent transmission or storage, the packet comprising a flag indicating that the speech segment is voiced, the fundamental frequency, the normalized harmonic amplitude vector and the sum of all harmonic amplitudes.

16. A method for synthesizing audio signals from data packets, at least one of the data packets representing a time segment of a signal characterized by the presence of a fundamental frequency, said at least one data packet comprising a sequence of encoded amplitudes of harmonic frequencies related to the fundamental frequency, the method comprising the steps of:

for each data packet detecting the presence of a fundamental frequency; and synthesizing an audio signal in response only to the detected fundamental frequency and the sequence of amplitudes of harmonic frequencies in said at least one data packet.

17. The method of claim 16 wherein the audio signals being synthesized are speech signals and wherein following the step of detecting the method further comprises the steps of:

determining whether a data packet represents a voiced or unvoiced speech segment on the basis of the detected fundamental frequency;

synthesizing unvoiced speech in response to encoded information in a data packet determined to represent unvoiced speech; and providing amplitude and phase continuity on the boundary between adjacent synthesized speech segments.

18. The method of claim 17 wherein the step of synthesizing unvoiced speech comprises the step of passing a white noise signal through an autoregressive digital filter the coefficients of which are the LPC coefficients corresponding to the unvoiced speech segment and the gain of the filter is adjusted on the basis of the prediction error power associated with the LPC coefficients.

19. The method of claim 17 wherein the step of synthesizing a voiced speech comprises the steps of:

determining the initial phase offsets for each harmonic frequency; and synthesizing voiced speech using the encoded sequence of amplitudes of harmonic frequencies and the determined phase offsets.

20. The method of claim 19 wherein the voiced speech is synthesized using the equation:

$$S(m) = \sum_{h=0}^{H-1} \left( A^{-}(m) + \frac{\Delta A(m)}{M} \cdot m \right) \sin((h+1)\phi(m) + \xi(h));$$

$$m = 0, \ldots, M-1.$$

where $A^{-}(h)$ is the amplitude of the signal at the end of the previous segment; $\phi(m)=2\pi\ m\ F_0/f_s$, where $F_0$ is the fundamental frequency and $f_s$ is the sampling frequency; and $\xi(h)$ is the initial phase of the h-th harmonic.

21. The method of claim 20 wherein phase continuity for each harmonic frequency in adjacent voiced segments is insured using the boundary condition:

$$\xi(h)=(h+1)\phi^{-}(M)+\xi^{-}(h),$$

where $\phi^{-}(M)$ and $\xi^{-}(h)$ are the corresponding quantities of the previous segment.

22. The method of claim 20 wherein the initial phase for each harmonic frequency in an unvoiced-to-voiced transition is computed using the condition:

$$\xi(h)=\sin^{-1}(\alpha);$$

$$\alpha = \frac{S(M)}{\sum_{i=0}^{H-1} A_i}\ ;\ i=0, \ldots, H-1.$$

where S(M) is the M-th sample of the unvoiced speech segment; A are the harmonic amplitudes for i=0, . . . , H−1; and $|\alpha|<1$, and $\phi(m)$ is evaluated at the M+1 sample.

23. The method of claim 22 further comprising the step of generating sound effects by changing the fundamental frequency $F_0$ and the values of the harmonic amplitudes encoded in the data packet.

24. The method of claim 22 further comprising the step of generating sound effects by changing the length of the synthesized signal segments.

25. The method of claim 17 wherein the step of synthesizing voiced speech comprises the steps of:

computing the frequencies of the harmonics on the basis of the fundamental frequency of the segment;

generating voiced speech as a superposition of harmonic frequencies with amplitudes corresponding to the encoded amplitudes in the voiced data packet and phases determined as to insure phase continuity at the boundary between adjacent speech segments.

26. The method of claim 17 wherein the step of providing amplitude and phase continuity on the boundary between adjacent synthesized speech segments comprises the steps of:

determining the difference between the amplitude A(h) of h-th harmonic in the current segment and the corresponding amplitude $A^{-}(h)$ of the previous segment, the difference being denoted as $\Delta A(h)$; and providing a linear interpolation of the current segment amplitude between the end points of the segment using the formula:

$$A(h,m)=A^{-}(h,0)+m.\Delta A(h)/M, \text{ for } m=0, \ldots, M-1.$$

27. A system for processing audio signals comprising:

means for dividing an audio signal into segments, each segment representing one of a succession of time intervals;

means for detecting for each segment the presence of a fundamental frequency;

means for estimating the amplitudes of a set of sinusoids harmonically related to the detected fundamental frequency, the set of sinusoids being representative of the signal in the time segment; and means for encoding the set of harmonic amplitudes, each amplitude being normalized by the sum of all amplitudes.

28. The system of claim 27 wherein the audio signal is a speech signal and the system further comprises means for determining whether a segment represents voiced or unvoiced speech on the basis of the detected fundamental frequency.

29. The system of claim 28 further comprising:

means for computing a set of linear predictive coding (LPC) coefficients corresponding to a speech segment; and means for encoding the LPC coefficients and the linear prediction error power associated with the computed LPC coefficients.

30. The system of claim 29 wherein the means for encoding the LPC coefficients comprises means for computing the roots of a LPC coefficients polynomial and means for encoding polynomial roots into a codebook entry.

31. The system of claim 30 wherein the means for encoding polynomial roots comprises a neural network providing the capability of vector quantizing the polynomial roots into a vector codebook entry.

32. The system of claim 28 further comprising windowing means providing the capability of multiplying the signal segment with the coefficients of a predetermined window function.

33. The system of claim 28 wherein the means for estimating harmonic amplitudes comprises:

means for performing a discrete Fourier transform (DFT) of a digitized signal segment; and means for computing a root sum square of the samples of the DFT in the neighborhood of a harmonic frequency, said means obtaining an estimate of the amplitude of the harmonic frequency.

34. The system of claim 33 wherein the means for performing a DFT computation comprises means for performing a fast Fourier transform (FFT) of the signal segment.

35. The system of claim 33 further comprising means for padding the input signal with zeros.

36. The system of claim 33 further comprising means for normalizing the computed harmonic amplitudes.

37. The system of claim 36 further comprising means for forming a data packet corresponding to each unvoiced segment, the packet comprising a flag indicating that the speech segment is unvoiced, the codebook entry for the roots of the LPC coefficients polynomial and the linear prediction error power associated with the computed LPC coefficients; and means for forming a data packet corresponding to each voiced segment for subsequent transmission or storage, the packet comprising a flag indicating that the speech segment is voiced, the fundamental frequency, a vector of the normalized harmonic amplitudes and the sum of all harmonic amplitudes.

38. A system for synthesizing audio signals from data packets, at least one of the data packets representing a time segment of a signal characterized by the presence of a fundamental frequency, said at least one data packet comprising a sequence of encoded amplitudes of harmonic frequencies related to the fundamental frequency, the system comprising:

means for determining the fundamental frequency of the signal represented by said at least one data packet;

means for synthesizing an audio signal segment in response to the determined fundamental frequency and the sequence of amplitudes of harmonic frequencies in said at least one data packet; and means for providing amplitude and phase continuity on the boundary between adjacent synthesized audio signal segments.

39. The system of claim 38 wherein the means for synthesizing comprises means for determining the initial phase offsets for each harmonic frequency.

40. The system of claim 39 wherein the means for providing amplitude and phase continuity comprises means for providing a linear interpolation between the values of the amplitude of the signal at the end points of the segment.

41. The system of claim 39 wherein the means for providing amplitude and phase continuity further comprises means for computing conditions for phase continuity between harmonic frequencies in adjacent speech segments in accordance with the formula:

$$\xi(h)=(h+1)\phi^{-}(M)+\xi^{-}(h),$$

where $\xi(h)$ is the initial phase of the h-th harmonic of the current segment; $\phi(m)=2\pi\ m\ F_0/f_s$, where $F_0$ is the fundamental frequency and $f_s$ is the sampling frequency; and $\xi^{-}(M)$ and $\xi^{-}(h)$ are the corresponding quantities of the previous segment.

42. The system of claim 41 further comprising means for generating sound effects by changing the fundamental frequency $F_0$, and the encoded values of the harmonic amplitudes.

43. The system of claim 41 further comprising means for generating sound effects by changing the size of synthesized signal segments.

44. A system for synthesizing speech from data packets, the data packets representing voiced or unvoiced speech segments, comprising:

means for determining whether a data packet represents a voiced or unvoiced speech segment;

means for synthesizing unvoiced speech in response to encoded information in an unvoiced data packet;

means for synthesizing voiced speech segment signal in response only to a sequence of amplitudes of harmonic frequencies encoded in a voiced data packet; and means for providing amplitude and phase continuity on the boundary between adjacent synthesized speech segments.

45. The system of claim 44 wherein the means for synthesizing unvoiced speech comprises: means for generating white noise; a digital synthesis filter; means for initializing the coefficients of the synthesis filter using a set of parameters representative of an unvoiced speech segment, and means for adjusting the gain of the synthesis filter.

46. The system of claim 44 wherein the means for synthesizing a voiced speech segment comprises means for determining the initial phase offsets for each harmonic frequency.

47. The system of claim 44 wherein the means for providing amplitude and phase continuity comprises means for providing a linear interpolation between the values of the signal amplitude at the end points of the segment.

48. A method for processing an audio signal comprising the steps of:

dividing the signal into segments, each segment representing one of a succession of time intervals;

detecting for each segment the presence of a fundamental frequency;

if such a fundamental frequency is detected, estimating the amplitudes of a set of sinusoids harmonically related to the detected fundamental frequency, the set of sinusoids being representative of the signal in the time segment;

encoding for subsequent storage and transmission the set of the estimated harmonic amplitudes, each amplitude being normalized by the sum of all amplitudes; and synthesizing an audio signal in response only to the fundamental frequency and the sequence of normalized amplitudes of harmonic frequencies.

49. The method of claim 48 wherein the step of estimating harmonic amplitudes comprises the steps of:

performing a discrete Fourier transform (DFT) of the speech signal;

computing a root sum square of the samples of the power DFT of said speech signal in the neighborhood of each harmonic frequency to obtain an estimate of the corresponding harmonic amplitude, wherein prior to the step of performing a DFT the speech signal is windowed by a window function providing reduced spectral leakage.

50. The method of claim 49 wherein the estimates of the harmonic amplitudes $A_H(h,F_0)$ are computed according to the equation:

$$A_H(h,F_0)=\frac{1}{N}\cdot\left[2\cdot\sum_{k=\left[(h+1)\frac{2F_0}{f_s}N\right]-B}^{\left[(h+1)\frac{2F_0}{f_s}N\right]+B}\left[\sum_{n=0}^{2N-1}y_{2N}(n)\cdot e^{-j2\pi\frac{k}{2N}\cdot n}\right]^2\right]^{\frac{1}{2}}$$

$$h=0,1,2,\ldots,H-1;\ H\leq\left[\frac{f_s}{2F_0}\right]$$

where $A_H(h,F_0)$ is the estimated amplitude of the h-th harmonic frequency; $F_0$ is the fundamental frequency; B is the half bandwidth of the main lobe of the Fourier transform of the window function; and $y_{2N}(n)$ is the windowed input signal padded with N zeros.

51. The method of claim 48 wherein the audio signal is a voice signal and the step of synthesizing the voice signal comprises the steps of:

computing the frequencies of the harmonics on the basis of the fundamental frequency of the segment; and generating voiced speech as a superposition of harmonic frequencies with amplitudes corresponding to the encoded amplitudes and phases determined as to insure phase continuity at the boundary between adjacent speech segments.

52. The method of claim 51 wherein the voiced speech is synthesized using the equation:

$$S(m) = \sum_{h=0}^{H-1} \left( A^{-}(m) + \frac{\Delta A(m)}{M} \cdot m \right) \sin((h+1)\phi(m) + \xi(h));$$

$m = 0, \ldots, M-1.$ where $A^{-}(h)$ is the amplitude of the signal at the end of the previous segment; $\phi(m)=2\pi\ m\ F_0/f_s$, where $F_0$ is the fundamental frequency and $f_s$ is the sampling frequency; and $\xi(h)$ is the initial phase of the h-th harmonic.

* * * * *